US010108650B2

(12) United States Patent
Tanaka et al.

(10) Patent No.: US 10,108,650 B2
(45) Date of Patent: Oct. 23, 2018

(54) INFORMATION PROCESSING DEVICE AND INFORMATION PROCESSING METHOD

(71) Applicant: SONY CORPORATION, Tokyo (JP)

(72) Inventors: Yu Tanaka, Tokyo (JP); Taizo Shirai, Kanagawa (JP); Yohei Kawamoto, Tokyo (JP); Kazuya Kamio, Tokyo (JP); Koichi Sakumoto, Tokyo (JP)

(73) Assignee: SONY CORPORATION, Tokyo (JP)

( * ) Notice: Subject to any disclaimer, the term of this patent is extended or adjusted under 35 U.S.C. 154(b) by 541 days.

(21) Appl. No.: 14/437,306

(22) PCT Filed: Oct. 22, 2013

(86) PCT No.: PCT/JP2013/078594
§ 371 (c)(1),
(2) Date: Apr. 21, 2015

(87) PCT Pub. No.: WO2014/073370
PCT Pub. Date: May 15, 2014

(65) Prior Publication Data

US 2015/0269208 A1 Sep. 24, 2015

(30) Foreign Application Priority Data

Nov. 12, 2012 (JP) ................................ 2012-248052

(51) Int. Cl.
*G06F 17/30* (2006.01)
*G06F 21/62* (2013.01)

(52) U.S. Cl.
CPC .. *G06F 17/30339* (2013.01); *G06F 17/30389* (2013.01); *G06F 17/30522* (2013.01);
(Continued)

(58) Field of Classification Search
CPC ......... G06F 17/30864; G06F 17/30554; G06F 17/30867; G06F 17/30424;
(Continued)

(56) References Cited

U.S. PATENT DOCUMENTS 7,177,798 B2 * 2/2007 Hsu ........................ G10L 15/18
704/10
8,423,523 B2 * 4/2013 Vergnory-Mion ..........................
G06F 17/30286
706/12

(Continued)

FOREIGN PATENT DOCUMENTS

JP 2011-100116 A 5/2011
JP 2012-159982 A 8/2012

(Continued)

OTHER PUBLICATIONS

L. Sweeney., "K-Anonymity: A Model for Protecting Privacy", International Journal on Uncertainty, Fuzziness and Knowledge-Based Systems, 10 (5), 2002, 557-570.

(Continued)

*Primary Examiner* — Dung K Chau
(74) *Attorney, Agent, or Firm* — Chip Law Group

(57) ABSTRACT

There is provided an information processing device including a query generation unit configured to generate, on the basis of a table in a database and any query with regard to the table, one or more different queries, and a table search unit configured to search for the number of tables that are different from the table and in which a result of the different query generated by the query generation unit is not in conflict with a result of the any query.

14 Claims, 25 Drawing Sheets

(52) U.S. Cl.
CPC .. *G06F 17/30533* (2013.01); *G06F 17/30595* (2013.01); *G06F 17/30864* (2013.01); *G06F 21/6245* (2013.01)

(58) Field of Classification Search
CPC ......... G06F 17/30277; G06F 17/30991; G06F 17/30011; G06F 17/30477; G06F 17/30023; G06F 17/30112; G06F 17/3005
See application file for complete search history.

(56) References Cited

U.S. PATENT DOCUMENTS

| | | | | |
|---|---|---|---|---|
| 9,031,845 | B2 * | 5/2015 | Kennewick | G06F 17/30654 455/517 |
| 2005/0210010 | A1 * | 9/2005 | Larson | G06F 17/30522 |
| 2006/0161568 | A1 * | 7/2006 | Dettinger | G06F 17/30398 |
| 2006/0167850 | A1 * | 7/2006 | Fish | G06F 17/30483 |
| 2007/0050393 | A1 * | 3/2007 | Vogel | G06F 17/30864 |
| 2008/0077570 | A1 * | 3/2008 | Tang | G06F 17/30684 |
| 2012/0084322 | A1 * | 4/2012 | Goldstein | G06F 17/30516 707/773 |
| 2012/0096054 | A1 * | 4/2012 | Egan | G06F 17/30902 707/812 |
| 2013/0246412 | A1 * | 9/2013 | Shokouhi | G06F 17/30867 707/730 |
| 2013/0311442 | A1 * | 11/2013 | Weber | G06F 17/30554 707/714 |

FOREIGN PATENT DOCUMENTS

| | | | |
|---|---|---|---|
| WO | 2012090628 | A1 | 7/2012 |
| WO | 2012093522 | A1 | 7/2012 |

OTHER PUBLICATIONS

Maurizio Atzori et al., “Anonymity Preserving Pattern Discovery”, The VLDB Journal (2008), 17:703-727 DOI 10.1007/S00778-006-0034.

* cited by examiner

| CUSTOMER NUMBER | CUSTOMER NAME | GENDER | AGE | REGION CODE | PRODUCT CODE | EXPENSE |
|---|---|---|---|---|---|---|
| 1021 | AAAAA | 0 | 30 | 0 | 1000 | 3000 |
| 1022 | BBBBB | 1 | 42 | 1 | 1000 | 5000 |
| 1023 | CCCCC | 1 | 43 | 1 | 1010 | 2000 |
| 1024 | DDDDD | 0 | 35 | 2 | 2000 | 12000 |
| 1025 | EEEEE | 0 | 25 | 0 | 5000 | 6000 |
| 1026 | FFFFF | 0 | 49 | 3 | 5010 | 7000 |
| 1027 | GGGGG | 1 | 32 | 4 | 4000 | 8000 |
| 1028 | HHHHH | 1 | 37 | 5 | 3000 | 23000 |
| 1029 | IIIII | 1 | 28 | 6 | 3010 | 3000 |
| 1030 | JJJJJ | 1 | 41 | 1 | 2000 | 11000 |

| CUSTOMER NUMBER | CUSTOMER NAME | GENDER | AGE | REGION CODE | PRODUCT CODE | EXPENSE |
|---|---|---|---|---|---|---|
| 1021 | AAAAA | 0 | 30 | 0 | 1000 | 3000 |
| 1022 | BBBBB | 1 | 42 | 1 | 1000 | 5000 |
| 1023 | CCCCC | 1 | 43 | 1 | 1010 | 2000 |
| 1024 | DDDDD | 0 | 35 | 2 | 2000 | 12000 |
| 1025 | EEEEE | 0 | 25 | 0 | 5000 | 6000 |
| 1026 | FFFFF | 0 | 49 | 3 | 5010 | 7000 |
| 1027 | GGGGG | 1 | 32 | 4 | 4000 | 8000 |
| 1028 | HHHHH | 1 | 37 | 5 | 3000 | 23000 |
| 1029 | IIIII | 1 | 28 | 6 | 3010 | 3000 |
| 1030 | JJJJJ | 1 | 41 | 1 | 2000 | 11000 |

| PATIENT NAME | AGE GROUP | DISEASE NAME |
|---|---|---|
| AAAAA | 10S | COLD |
| BBBBB | 20S | INFECTION |
| CCCCC | 30S | STROKE |
| DDDDD | 30S | STROKE |
| EEEEE | 20S | INFECTION |
| FFFFF | 30S | CANCER |
| GGGGG | 30S | CANCER |
| HHHHH | 40S | COLD |
| IIIII | 40S | DIABETES |
| JJJJJ | 50S | COLD |
| KKKKK | 50S | COLD |
| LLLLL | 60S | DIABETES |

FIG. 5

| | MALIN-GERING | COLD | STROKE | INFECTION | DIABETES | CANCER |
|---|---|---|---|---|---|---|
| 10S | | 1 | | | | |
| 20S | | | | 2 | | |
| 30S | | | 2 | | | 2 |
| 40S | | 1 | | | 1 | |
| 50S | | 2 | | | | |
| 60S | | | | | 1 | |

| | MALIN-GERING | COLD | STROKE | INFECTION | DIABETES | CANCER |
|---|---|---|---|---|---|---|
| 10S | | 1 | | | | |
| 20S | | | | 2 | | |
| 30S | | | 2 | | | 2 |
| 40S | | 1 | | | 1 | |
| 50S | | 2 | | | | |
| 60S | | | | | 1 | |

| | MALIN-GERING | COLD | STROKE | INFECTION | DIABETES | CANCER | d |
|---|---|---|---|---|---|---|---|
| 10S | | | | | | | 1 |
| 20S | | | | | | | 2 |
| 30S | | | | | | | 4 |
| 40S | | | | | | | 2 |
| 50S | | | | | | | 2 |
| 60S | | | | | | | 1 |
| e | 0 | 4 | 2 | 2 | 2 | 2 | |

| | MALIN-GERING | COLD | STROKE | INFECTION | DIABETES | CANCER | d |
|---|---|---|---|---|---|---|---|
| 10S | ? | ? | ? | ? | ? | ? | 1 |
| 20S | | 3 | | | | | 2 |
| 30S | | | | | | | 4 |
| 40S | | | | | | | 2 |
| 50S | | | | | | | 2 |
| 60S | | | | | | | 1 |
| e | 0 | 4 | 2 | 2 | 2 | 2 | |

| | MALIN-GERING | COLD | STROKE | INFECTION | DIABETES | CANCER | d |
|---|---|---|---|---|---|---|---|
| 10S | | 1 | | | | | 1 |
| 20S | | 3 | | 2 | | | 2 |
| 30S | | | 2 | | | 2 | 4 |
| 40S | | 1 | | | 1 | | 2 |
| 50S | | 2 | | | | | 2 |
| 60S | | | | | 1 | | 1 |
| e | 0 | 4 | 2 | 2 | 2 | 2 | |

FIG. 11

| | MALIN-GERING | COLD | STROKE | INFECTION | DIABETES | CANCER | d |
|---|---|---|---|---|---|---|---|
| 10S | | | 1 | | | | 1 |
| 20S | | 3 | | 2 | | | 2 |
| 30S | | 1 | 1 | | | 2 | 4 |
| 40S | | 1 | | | 1 | | 2 |
| 50S | | 2 | | | | | 2 |
| 60S | | | | | 1 | | 1 |
| e | 0 | 4 | 2 | 2 | 2 | 2 | |

| | MALIN-GERING | COLD | STROKE | INFECTION | DIABETES | CANCER | d |
|---|---|---|---|---|---|---|---|
| 10S | | | | 1 | | | 1 |
| 20S | | 1 | 3 | 1 | | | 2 |
| 30S | | | 2 | | | 2 | 4 |
| 40S | | 1 | | | 1 | | 2 |
| 50S | | 2 | | | | | 2 |
| 60S | | | | | 1 | | 1 |
| e | 0 | 4 | 2 | 2 | 2 | 2 | |

FIG. 14

```
Input: CF, T
Output: G
DC = {Q × {s} | ∃q ∈ Q, T_{q,s} ≠ 0};
for all C ∈ CF do
    DC' = ∅;
    for all D ∈ DC do
        if ∃(q, s) ∈ Q × S, T_{q,s} ≠ 0, (q, s) ∈ D ∩ C then
            DC' ← DC' ∪ {D ∩ C};
        end if
        if ∃(q, s) ∈ Q × S, T_{q,s} ≠ 0, (q, s) ∈ D ∩ C̄ then
            DC' ← DC' ∪ {D ∩ C̄};
        end if
    end for
    DC ← DC';
end for
return Associated graph G of T and DC;
```

| | MALIN-GERING | COLD | STROKE | INFECTION | DIABETES | CANCER | d |
|---|---|---|---|---|---|---|---|
| 10S | | 1 | | | | | 1 |
| 20S | | | | 2 | | | 2 |
| 30S | | | 2 | | | 2 | 4 |
| 40S | | 1 | | | 1 | | 2 |
| 50S | | 2 | | | | | 2 |
| 60S | | | | | 1 | | 1 |
| e | 0 | 4 | 2 | 2 | 2 | 2 | |

FIG. 16

~~Qx{MALINGERING}~~ Qx{COLD}

| | MALIN-GERING | COLD | STROKE | INFECTION | DIABETES | CANCER | d |
|---|---|---|---|---|---|---|---|
| 10S | | 1 | | | | | 1 |
| 20S | | | | 2 | | | 2 |
| 30S | | | 2 | | | 2 | 4 |
| 40S | | 1 | | | 1 | | 2 |
| 50S | | 2 | | | | | 2 |
| 60S | | | | | 1 | | 1 |
| e | 0 | 4 | 2 | 2 | 2 | 2 | |

FIG. 17

Q× {COLD} C1

| | MALIN-GERING | COLD | STROKE | INFECTION | DIABETES | CANCER | d |
|---|---|---|---|---|---|---|---|
| 10S | | 1 | | | | | 1 |
| 20S | | | | 2 | | | 2 |
| 30S | | | 2 | | | 2 | 4 |
| 40S | | 1 | | | 1 | | 2 |
| 50S | | 2 | | | | | 2 |
| 60S | | | | | 1 | | 1 |
| e | 0 | 4 | 2 | 2 | 2 | 2 | |

FIG. 18

$Q\times\{COLD\}\cap C_1$ $C_1$

| | MALIN-GERING | COLD | STROKE | INFECTION | DIABETES | CANCER | d |
|---|---|---|---|---|---|---|---|
| 10S | | 1 | | | | | 1 |
| 20S | | | | 2 | | | 2 |
| 30S | | | 2 | | | 2 | 4 |
| 40S | | 1 | | | 1 | | 2 |
| 50S | | 2 | | | | | 2 |
| 60S | | | | | 1 | | 1 |
| e | 0 | 4 | 2 | 2 | 2 | 2 | |

$Q\times\{COLD\}\cap\overline{C_1}$

FIG. 19

$Q \times \{COLD\} \cap C_1$ $C_1$

| | MALINGERING | COLD | STROKE | INFECTION | DIABETES | CANCER | d |
|---|---|---|---|---|---|---|---|
| 10S | | 1 | | | | | 1 |
| 20S | | | | 2 | | | 2 |
| 30S | | | 2 | | | 2 | 4 |
| 40S | | 1 | | | 1 | | 2 |
| 50S | | 2 | | | | | 2 |
| 60S | | | | | 1 | | 1 |
| e | 0 | 4 | 2 | 2 | 2 | 2 | |

$Q \times \{COLD\} \cap \overline{C}_1$ $Q \times \{STROKE\}$

FIG. 20

$Q \times \{COLD\} \cap C_1$ $C_1$ $Q \times \{STROKE\} \cap C_1$

| | MALINGERING | COLD | STROKE | INFECTION | DIABETES | CANCER | d |
|---|---|---|---|---|---|---|---|
| 10S | | 1 | | | | | 1 |
| 20S | | | | 2 | | | 2 |
| 30S | | | 2 | | | 2 | 4 |
| 40S | | 1 | | | 1 | | 2 |
| 50S | | 2 | | | | | 2 |
| 60S | | | | | 1 | | 1 |
| e | 0 | 4 | 2 | 2 | 2 | 2 | |

$Q \times \{COLD\} \cap \overline{C}_1$ $Q \times \{STROKE\} \cap \overline{C}_1$

ENTRY BELONGING TO TABLE IS NOT INCLUDED

FIG. 21

| | MALIN-GERING | COLD | STROKE | INFECTION | DIABETES | CANCER | d |
|---|---|---|---|---|---|---|---|
| 10S | | 1 | | | | | 1 |
| 20S | | | | 2 | | | 2 |
| 30S | | | 2 | | | 2 | 4 |
| 40S | | 1 | | | 1 | | 2 |
| 50S | | 2 | | | | | 2 |
| 60S | | | | | 1 | | 1 |
| e | 0 | 4 | 2 | 2 | 2 | 2 | |

FIG. 22

| | MALIN-GERING | COLD | STROKE | INFECTION | DIABETES | CANCER | d |
|---|---|---|---|---|---|---|---|
| 10S | | 1 | | | | | 1 |
| 20S | | | | 2 | | | 2 |
| 30S | | | 2 | | | 2 | 4 |
| 40S | | 1 | | | 1 | | 2 |
| 50S | | 2 | | | | | 2 |
| 60S | | | | | 1 | | 1 |
| e | 0 | 4 | 2 | 2 | 2 | 2 | |

A table T on Q × S, and a disjoint cover of T DC = $\{D_1, D_2, \cdots, D_m\}$ are given. Then, a Labeled Multidigraph $G = \langle V, A, \Sigma, m \rangle$ is a graph associated with T and DC, if the following are satisfied:

1. a vertex set $V = \{i \in \{1, 2, \cdots, m\} \mid \exists (q,s) \in D_i, T_{q,s} \neq 0\}$ is given;

2. a label set $\Sigma = Q$ is given;

3. an edge set $$A = \{(i, j, q) \in V \times V \times Q \mid \exists s, s' \in S, (q, s) \in D_i, (q, s') \in D_j, T_{q,s} \neq 0\}$$

is given; and 4. a Multiplicity $$\begin{array}{rccc} m: & A & \longrightarrow & \mathbb{N}_{>0} \\ & \Psi & & \Psi \\ & (i, j, q) & \longmapsto & \sum_{s:(q,s) \in D_i} T_{q,s} \end{array}$$

is given.

| | MALIN-GERING | COLD | STROKE | INFECTION | DIABETES | CANCER | d |
|---|---|---|---|---|---|---|---|
| 10S | | 1 | | | | | 1 |
| 20S | | | | 2 | | | 2 |
| 30S | | | 2 | | | 2 | 4 |
| 40S | | 1 | | | 1 | | 2 |
| 50S | | 2 | | | | | 2 |
| 60S | | | | | 1 | | 1 |
| e | 0 | 4 | 2 | 2 | 2 | 2 | |

Columns: $D_1$ (COLD), $D_2$ (INFECTION), $D_3$ (DIABETES), $D_4$ (CANCER), $D_5$ (STROKE), $D_6$ (COLD)

| | MALIN-GERING | COLD | STROKE | INFECTION | DIABETES | CANCER | d |
|---|---|---|---|---|---|---|---|
| 10S | | 1 | | | | | 1 |
| 20S | | | | 2 | | | 2 |
| 30S | | | 2 | | | 2 | 4 |
| 40S | | 1 | | | 1 | | 2 |
| 50S | | 2 | | | | | 2 |
| 60S | | | | | 1 | | 1 |
| e | 0 | 4 | 2 | 2 | 2 | 2 | |

Columns labeled: 1 (COLD), 2 (INFECTION), 3 (DIABETES), 4 (CANCER), 5 (STROKE), 6 (COLD)

| | MALINGERING | COLD | STROKE | INFECTION | DIABETES | CANCER | d |
|---|---|---|---|---|---|---|---|
| 10S | | 1 | | | | | 1 |
| 20S | | | | 2 | | | 2 |
| 30S | | | 2 | | | 2 | 4 |
| 40S | | 1 | | | 1 | | 2 |
| 50S | | 2 | | | | | 2 |
| 60S | | | | | 1 | | 1 |
| e | 0 | 4 | 2 | 2 | 2 | 2 | |

FIG. 30

Input: $G, l$

Output: "CF preserves privacy." or "CF violates privacy."

for all $q \in Q$ such that $\exists i, j, (i, j, q) \in A$ do
    fix one $i$ such that $\exists j, (i, j, q) \in A$.
    $c = 0$;
    for all $j \in V$ such that $(i, j, q) \in A$ and there exists a path $(j, \cdots, i)$ on $G$
        $c \leftarrow c + 1$;
    end for
    if $c < l$ then
        return "CF violates privacy.";
    end if
end for
return "CF preserves privacy.";

| | MALIN-GERING | COLD | STROKE | INFECTION | DIABETES | CANCER | d |
|---|---|---|---|---|---|---|---|
| 10S | | 1 | | | | | 1 |
| 20S | | | | 2 | | | 2 |
| 30S | | | 2 | | | 2 | 4 |
| 40S | | 1 | | | 1 | | 2 |
| 50S | | 2 | | | | | 2 |
| 60S | | | | | 1 | | 1 |
| e | 0 | 4 | 2 | 2 | 2 | 2 | |

$D_1 \leftrightarrow 1$    $2 \leftrightarrow D_2$

| | MALIN-GERING | COLD | STROKE | INFECTION | DIABETES | CANCER | d |
|---|---|---|---|---|---|---|---|
| 10S | | | | 1 | | | 1 |
| 20S | | 1 | | 1 | | | 2 |
| 30S | | | 2 | | | 2 | 4 |
| 40S | | 1 | | | 1 | | 2 |
| 50S | | 2 | | | | | 2 |
| 60S | | | | | 1 | | 1 |
| e | 0 | 4 | 2 | 2 | 2 | 2 | |

INFORMATION PROCESSING DEVICE AND INFORMATION PROCESSING METHOD

TECHNICAL FIELD

The present disclosure relates to an information processing device, an information processing method, and a computer program.

BACKGROUND ART

Since technologies such as the Internet and sensors have been improved, information has been easily collected. Information has been actively collected, analyzed and used for a diverse business. In the past, a bank has analyzed an action history of a customer so as to decide the customer's credit. Recently, online shopping sites using the Internet have analyzed buying histories of customers so as to recommend new products. In addition, more direct business that collects and sells personal information of users and gives a part of profit back to the users has appeared.

As described above, information has been easily collected. On the other hand, issues of privacy of users have been exposed, and many cases such as leaking of personal information and violation of privacy have happened. Examples of advanced violation of privacy include specifying of privacy information of an attack target by using common information of the attack target registered in a plurality of databases and gathering a name (see Non-Patent Literature 1).

Such issues of privacy have been pointed out clearly since around 2000. Accordingly, many studies have been carried out actively, and diverse preventive technologies have been developed (for example, see Non-Patent Literature 2). However, the preventive technologies have been used for only a part of the issues.

Meanwhile, legislation has been developed. In the EU that is said to be the area most aggressive in preserving individual privacy, a regulation using an opt-in rule as a basic principle has been proposed, the opt-in rule seeking prior consent with regard to use of personal information for business.

CITATION LIST

Patent Literature

Patent Literature 1: JP 2011-100116A

Non-Patent Literature

Non-Patent Literature 1: L. Sweeney. k-anonymity: a model for protecting privacy. International Journal on Uncertainty, Fuzziness and Knowledge-based Systems, 10(5): 557-570, 2002

Non-Patent Literature 2: M. Atzori, F. Bonchi, F. Giannotti, D. Pedreschi. Anonymity Preserving Pattern Discovery. The International Journal on Very Large Data Bases, Volume 17 Issue 4, July 2008.

SUMMARY OF INVENTION

Technical Problem

According to the above-described circumstances, there is a trade-off between use of personal information for business and preservation of the personal information. A technology of precisely measuring this trade-off is necessary for companies to appropriately balance the use of personal information for business and the preservation of privacy.

Accordingly, the present disclosure proposes a novel and improved information processing device, information processing method and computer program capable of appropriately measuring risk of privacy violation caused by a result of analyzing data.

Solution to Problem

According to the present disclosure, there is provided an information processing device including a query generation unit configured to generate, on the basis of a table in a database and any query with regard to the table, one or more different queries, and a table search unit configured to search for the number of tables that are different from the table and in which a result of the different query generated by the query generation unit is not in conflict with a result of the any query.

According to the present disclosure, there is provided an information processing device including a table providing unit configured to provide another device with a table in a database and any query with regard to the table, and a result acquisition unit configured to acquire, from the another device, information about whether or not attribute information of an individual is specified from a result of the any query with regard to the table, based on information on the number of tables that are different from the table and in which a result of a different query generated on the basis of the any query is not in conflict with the result of the any query.

According to the present disclosure, there is provided an information processing system including a server device, and a terminal device. The terminal device includes a table providing unit configured to provide the server device with any query with regard to a table in a database, and a result acquisition unit configured to acquire, from the server device, information about whether attribute information of an individual is not specified from a result of the any query with regard to the table after disclosing the result of the any query, based on information on the number of tables that are different from the table and in which a result of a different query generated on the basis of the any query is not in conflict with the result of the any query. The server device includes a query generation unit configured to generate, on the basis of the table and the any query with regard to the table acquired from the terminal device, one or more of the different query, and a table search unit configured to search for the number of tables that are different from the table and in which a result of the different query generated by the query generation unit is not in conflict with the result of the any query, and configured to provide the terminal device with information about whether attribute information of an individual is not specified from the result of the any query after disclosing the result of the any query, based on the search result.

According to the present disclosure, there is provided an information processing method including generating, on the basis of a table in a database and any query with regard to the table, one or more different queries, and searching for the number of tables that are different from the table and in which a result of the generated different query is not in conflict with a result of the any query.

According to the present disclosure, there is provided a computer program for causing a computer to execute generating, on the basis of a table in a database and any query with regard to the table, one or more different queries, and searching for the number of tables that are different from the table and in which a result of the generated different query is not in conflict with a result of the any query.

Advantageous Effects of Invention

As described above, according to the present disclosure, there is provided a novel and improved information processing device, information processing method and computer program capable of appropriately measuring risk of privacy violation caused by a result of analyzing data.

BRIEF DESCRIPTION OF DRAWINGS

FIG. 2 is an explanatory diagram showing definition of terms according to an embodiment of the present disclosure.

FIG. 3 is an explanatory diagram showing definition of terms according to an embodiment of the present disclosure.

FIG. 4 is an explanatory diagram showing definition of terms according to an embodiment of the present disclosure.

FIG. 5 is an explanatory diagram showing definition of terms according to an embodiment of the present disclosure.

FIG. 6 is an explanatory diagram showing definition of terms according to an embodiment of the present disclosure.

FIG. 8 is an explanatory diagram showing a feature of an attacker according to the present embodiment.

FIG. 9 is an explanatory diagram showing an example of homogeneity attack.

FIG. 10 is an explanatory diagram showing an example of a table.

FIG. 11 is an explanatory diagram showing an example of a table.

FIG. 14 is an explanatory diagram showing an example of a graph generation algorithm executed by a data analysis device 100 according to an embodiment of the present disclosure.

FIG. 15 is an explanatory diagram illustrating a graph generation algorithm executed by a data analysis device 100 according to an embodiment of the present disclosure.

FIG. 16 is an explanatory diagram illustrating a graph generation algorithm executed by a data analysis device 100 according to an embodiment of the present disclosure.

FIG. 17 is an explanatory diagram illustrating a graph generation algorithm executed by a data analysis device 100 according to an embodiment of the present disclosure.

FIG. 18 is an explanatory diagram illustrating a graph generation algorithm executed by a data analysis device 100 according to an embodiment of the present disclosure.

FIG. 19 is an explanatory diagram illustrating a graph generation algorithm executed by a data analysis device 100 according to an embodiment of the present disclosure.

FIG. 20 is an explanatory diagram illustrating a graph generation algorithm executed by a data analysis device 100 according to an embodiment of the present disclosure.

FIG. 21 is an explanatory diagram illustrating a graph generation algorithm executed by a data analysis device 100 according to an embodiment of the present disclosure.

FIG. 22 is an explanatory diagram illustrating a graph generation algorithm executed by a data analysis device 100 according to an embodiment of the present disclosure.

FIG. 24 is an explanatory diagram illustrating a graph generation algorithm executed by a data analysis device 100 according to an embodiment of the present disclosure.

FIG. 30 is an explanatory diagram showing an example of a loop check algorithm executed by a data analysis device 100 according to an embodiment of the present disclosure.

DESCRIPTION OF EMBODIMENTS

Figure 1:
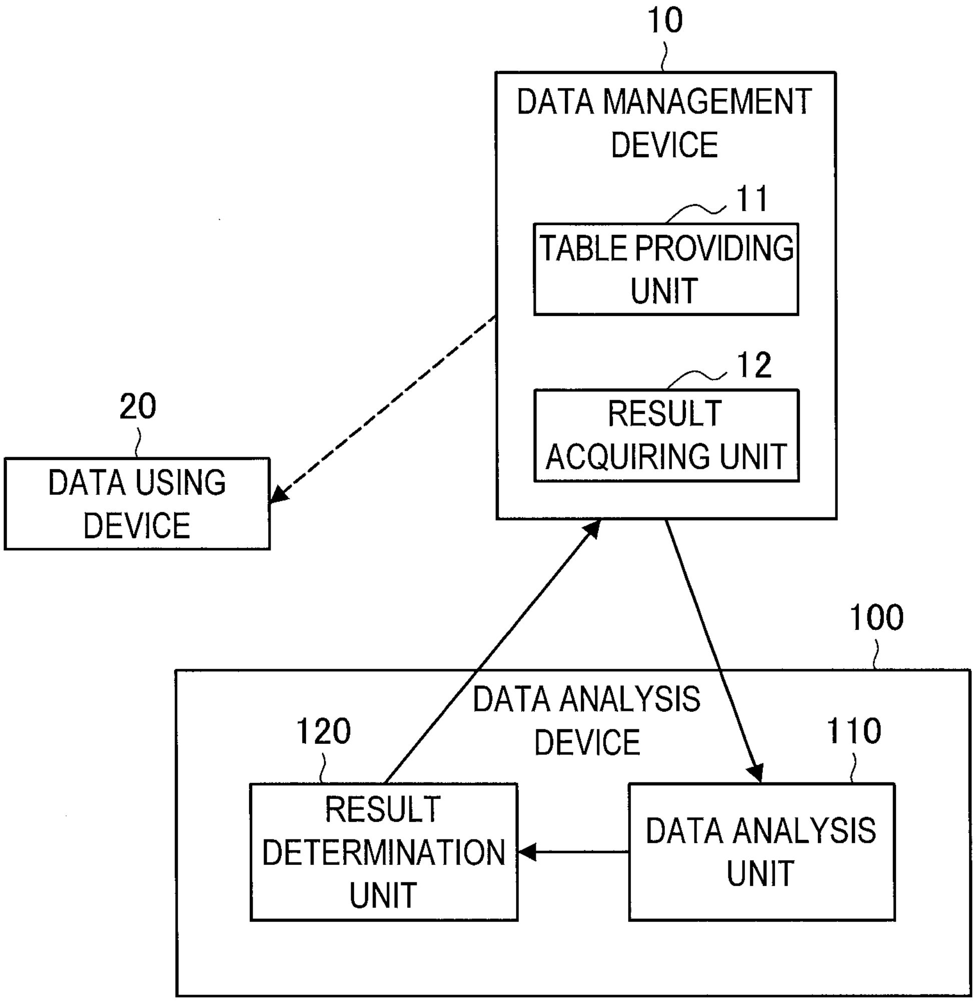
FIG. 1 is an explanatory diagram showing a configuration example of an information processing system 1 according to an embodiment of the present disclosure.

Hereinafter, preferred embodiments of the present disclosure will be described in detail with reference to the appended drawings. Note that, in this specification and the appended drawings, structural elements that have substantially the same function and structure are denoted with the same reference numerals, and repeated explanation of these structural elements is omitted.

Note that the description is given in the following order.

<1. Explanation of Existing Technology>
<2. Embodiment of Present Disclosure>
[System Configuration Example]
[Definition of Terms]
[Definition of Privacy]
[Operation of Algorithm]
<3. Hardware Configuration Example>
<4. Conclusion>

1. EXPLANATION OF EXISTING TECHNOLOGY

First, existing technologies are explained before explaining details of preferred embodiments of the present disclosure. Subsequently, issues in the existing technologies are explained. After that, details of preferred embodiments of the present disclosure are explained.

A technical field for considering handling of a database and privacy at a time of analyzing data is referred to as privacy-preserving data mining. In this technical field, techniques for preserving privacy in each step of a series of flow of data mining leading to collecting, shaping, and analyzing of data has been studied. Non-Patent Literatures 1 and 2 are past studies related to the present disclosure.

As an issue, Non-Patent Literature 1 focus on leakage of privacy information due to disappearing of individual anonymity caused by name gathering using publicly available information. According to Non-Patent Literature 1, medical records of the governor of Massachusetts can be specified by de-anonymization using publicly available information. In addition, the 1990 U.S. census data shows that 87% of the population can be uniquely specified on the basis of combinations of zip codes, genders, and dates of births. With regard to this issue, Non-Patent Literature 1 proposes a technique for improving anonymity by raising granularity of information to be used for name gathering (for example, perform abstraction such as change of a zip code from 1410031 to 141****, or change of gender from man to human). So as to measure such anonymity degree, Non-Patent Literature 1 proposes an index referred to as k-anonymity. After this study, many studies of technologies of publishing data on which a privacy preservation process has performed (privacy preserving data publishing) have been carried out actively.

On the other hand, in contrast to the privacy preserving data publishing, Non-Patent Literature 2 disclose a technology of handling a privacy issue concerning a result of analyzing data. As an example, Non-Patent Literature 2 shows that a product of which a customer wants to hide a fact of purchase may be specified by using the method disclosed in Non-Patent Literature 1 and using a result of calculating a frequent set in a customer purchase history at a supermarket, and further shows a possibility of privacy violation. The frequent set in the customer purchase history is a purchase pattern in which the number of purchase pattern people is more than or equal to a predetermined threshold. For example, in a case where the threshold is set to 50 and 53 customers have purchased an egg and milk, a purchase pattern of "the purchase of an egg and milk" is the frequent set because 53>50. So as to handle such issue, Non-Patent Literature 2 proposes a privacy index referred to as a k-anonymity pattern using an analogy to k-anonymity. Here, a pattern is interpreted as a group of customers fitting the pattern. Accordingly, a basic idea is that, when each group has k number of customers or more, anonymity of customers in each group can be preserved.

In addition, Patent Literature 1 discloses a technique for preserving privacy by disturbing data, the technique being referred to as a maintenance and disturbance technique. Patent Literature 1 proposes Pk-anonymity that is an index having a concept similar to the k-anonymity, and discloses a degree of concealing data that is not clarified in the past disturbance techniques, so as to predict an accurate trade-off by using an easy technique.

Such existing technologies aim for preserving individual privacy in all databases, and propose technologies for controlling a trade-off between a usability of data and privacy. The existing technologies relates to a technical field of database privacy, and are particularly useful in a case where disclosure of a database is necessary.

However, there are some cases where disclosure of a result of analyzing data is necessary instead of disclosure of a database itself.

First, an explanation is provided using a field of business intelligence as an example. The business intelligence is a technique that does not use mere row data accumulated by a company but aggregates, organizes, and analyzes the data so as to utilize the result for a management decision. In this case, an accurate result of analyzing data may be requested for a correct decision, and the result of analyzing data may be exchanged with another company as knowledge of the company. Accordingly, it is not preferable to distort original data.

Next, another explanation is provided using a field of recommendation technology as an example. The recommendation technology is a technology of analyzing provided data of a customer (for example, personal information or purchase data of the customer), extracting preference information of the customer, and recommending a most appropriate product for the customer on the basis of the result. In such recommendation technology, an accurate analysis result is desirable. Accordingly, it is not preferable to include noise in the provided data.

However, both examples have a risk of violation of individual privacy belonging to the original database, the violation being based on the analysis result or the recommendation result. In the example of business intelligence, the another company received the analysis result is a potential privacy violator. In the example of recommendation, a customer received the recommendation result is a potential privacy violator. Such potential privacy violators may try to estimate individual privacy information belonging to a database. In issue, such risk of privacy violation is different from the database privacy that handles disclosure of database and the corresponding issue of privacy. Actually, the existing technologies do not respond to direct evaluation of a risk of leaking privacy from a result of analyzing data.

Non-Patent Literature 2 is a study of such risk of leaking privacy from a result of analyzing data. The technology disclosed in Non-Patent Literature 2 preserves anonymity based on the k-anonymity pattern. However, further issues of privacy are outside a scope of the technology disclosed in Non-Patent Literature 2. Actual issues outside the scope include privacy violation attack referred to as homogeneity attack. According to the homogeneity attack, in a case of using quasi-identifiers and associated individual attribute information referred to as sensitive attributes, even if there is k number of individuals fitting a certain quasi-identifier according to a k-anonymity, a value of a sensitive attribute of an individual included in the k number of individuals is uniquely specified, when there is only a value of the sensitive attribute corresponding to the certain quasi-identifier.

Embodiments of the present disclosure described below handle the above-described issues, and relates to a technology of measuring a risk of leaking privacy, the risk being borne in a case where an analyzer of data discloses an analysis result to others.

2. EMBODIMENT OF PRESENT DISCLOSURE

System Configuration Example

First, with reference to the appended drawings, a configuration example of an information processing system according to an embodiment of the present disclosure is explained. FIG. 1 is an explanatory diagram showing a configuration example of an information processing system 1 according to an embodiment of the present disclosure. Hereinafter, with reference to FIG. 1, the configuration example of the information processing system 1 according to an embodiment of the present disclosure is explained.

As shown in FIG. 1, the information processing system 1 according to the embodiment of the present disclosure includes a data management device 10, a data using device 20, and a data analysis device 100.

The data management device 10 is a device for managing data in a database. The data managed by the data management device 10 is not limited to specific data. For example, the data management device 10 may manage information on a customer purchase history, or may manage information on a patient medical history. The data management device 10 can provide the data using device 20 with data under management. When providing the data, the data management device 10 provides not raw data but a result of counting the number of individuals who satisfies a given condition in a table. Such query for counting the number of individuals who satisfies a given condition in a table is referred to as a count query.

As shown in FIG. 1, the data management device 10 includes a table providing unit 11 and a result acquiring unit 12. The table providing unit 11 provides the data analysis device 100 with an analysis-target table and a query (count query) corresponding to the table. The result acquiring unit 12 acquires a result of analysis performed by the data analysis device 100 on the table and query that have been provided by the table providing unit 11.

The data using device 20 is a device that uses data provided by the data management device 10. For example, if the data management device 10 manages information on the customer purchase history, the data using device 20 can analyze sales and recommend a product to a customer by using the data provided by the data analysis device 100. Alternatively, if the data management device 10 manages information on the patient medical history, the data using device 20 can provide a medical institution and the like with information on a disease by using the data provided by the data analysis device 100.

However, a user who uses the data using device 20 does not always use data in good faith. Sometimes the user who uses the data using device 20 may analyze data provided by the data management device 10, and try to perform privacy violation referred to as homogeneity attack. Accordingly, the data provided to the data using device 20 by the data management device 10 is requested to be data appropriate to be used by the data using device 20 and data that does not violate privacy.

The data analysis device 100 is a device for analyzing whether data to be published by the data management device 10 does not violate privacy. As shown in FIG. 1, the data analysis device 100 includes a data analysis unit 110 and a result determination unit 120.

The data analysis unit 110 analyzes data managed by the data management device 10. Details of an analysis process executed by the data analysis unit 110 are described later. However, as a brief explanation, the data analysis unit 110 generates information to be used for risk measurement of homogeneity attack on individuals belonging to a table, the homogeneity attack being predicted by providing a result of count query corresponding to the table managed by the data management device 10. Specifically, the data analysis unit 110 generates one or more different queries based on a table in a database and any query with regard to the table. After generating the information to be used for risk measurement of homogeneity attack on individuals belonging to the table, the data analysis unit 110 provides the result determination unit 120 with the generated information.

By using the information generated by the data analysis unit 110, the result determination unit 120 determines whether the table managed by the data management device 10 does not violate privacy when the table is provided to an outside. Specifically, the result determination unit 120 determines whether the table does not violate privacy, by searching for the number of tables that are different from the table provided to the data analysis unit 110 and that a result of a different query generated by the data analysis unit 110 is not in conflict with a result of the any query provided to the data analysis unit 110. The result determination unit 120 provides the data management device 10 with a result of the determination.

The information processing system 1 according to an embodiment of the present disclosure includes has a configuration shown in FIG. 1. Accordingly, the data analysis device 100 can determine whether privacy is violated by data managed by the data management device 10 and to be provided to the data using device 20 even if the data using device 20 executes the homogeneity attack.

With reference to FIG. 1, the configuration example of the information processing system 1 according to an embodiment of the present disclosure has been explained. Next, an operation example of an information processing system 1 according to an embodiment of the present disclosure is explained. However, before the operation example of the information processing system 1 is explained, definition of terms to be used in the explanation and definition of privacy in the present embodiment are explained.

DEFINITION OF TERMS

First, definition of terms to be used in the explanation of the present embodiment is shown. FIGS. 2 and 3 are each an explanatory diagram showing definition of terms according to an embodiment of the present disclosure. FIGS. 2 and 3 show a table 130 to be used for explaining the definition of terms.

Such as "age" indicated by reference sign 131, an item indicating a feature of an individual is defined as an attribute. Accordingly, attributes in the table 130 shown in FIG. 2 are "customer number", "customer name", "gender", "age", "region code", "product code", and "expense." In the present embodiment, the attributes have discrete values. A concrete value of an attribute as indicated by reference sign 132 is defined as an attribute value as described below.

A group of attribute values related to an individual as indicated by reference sign 133 is defined as an entry. The table 130 shown in FIG. 2 includes 10 entries. Note that, respective attributes included in an entry are divided into three categories including an ID, a quasi-ID, and a sensitive attribute.

The ID is an identifier for identifying an individual as typified by an individual name. In the table 130 shown in FIG. 3, the "customer number" and "customer name" indicated by reference sign 134 correspond to the ID. In order to preserve privacy, such ID may be concealed or deleted from a database normally.

The sensitive attribute is an attribute considered to relate to individual privacy or an attribute considered to decide character of a table, in the table. In the table 130 shown in FIG. 3, the "product code" and "expense" correspond to the sensitive attribute. In the homogeneity attack, an attacker tries to know attribute values (sensitive attribute values) of the sensitive attribute related to an attack target.

The quasi-ID in the present embodiment is attributes other than the ID and the sensitive attribute. In the table 130 shown in FIG. 3, the "gender", "age" and "region code" correspond to the quasi-ID. In the homogeneity attack, the attacker knows attribute values (quasi-ID values) of the quasi-ID of the attack target, and uses such information for the attack.

The table is a set of the entries. With regard to a normal relational database, such as the table 130 shown in FIGS. 2 and 3, a table is represented in a manner that entries of respective individuals are listed as a column vector of attribute values. However, for convenience of explanation, the table is represented in a different way in the present embodiment.

There is considered a matrix in which combinations of all quasi-ID values are row indexes and combinations of all sensitive attribute values are column indexes. In this case, a numerical value of each matrix element is the number of individuals having an attribute value indicated by an index of the matrix element. Such matrix is defined as a table in the present embodiment.

FIGS. 4 and 5 are explanatory diagrams showing definition of terms according to an embodiment of the present disclosure. For convenience of explanation, a table 140 in FIG. 4 is a table in which each of a quasi-ID and a sensitive attribute has an item. In the table 140 in FIG. 4, patient names correspond to the ID, disease names correspond to the sensitive attribute, and age groups correspond to the quasi-ID. The patient names may be concealed or deleted from a database normally. The disease names are important information in data mining, but are information relating to patient privacy. The age group is an attribute other than the ID and the sensitive attribute. The age is privacy information, but is not so important.

The table 140 shown in FIG. 4 is represented as a matrix in which combinations of all quasi-ID values are row indexes and combinations of all sensitive attribute values are column indexes. A table in FIG. 5 is a table in which a numerical value of each matrix element is the number of individuals having an attribute value indicated by an index of the matrix element. Reference sign 141 indicates a set of possible quasi-IDs (QIs) in the table 140. Reference sign 142 indicates a set of possible sensitive attributes (SAs) in the table 140. Reference sign 143 indicates the number of elements, or in other words, "the number of stroke patients in their 30s."

Mathematical definition of the table in the present embodiment is as follows.

(Mathematical Definition of Table in Present Embodiment)

Finite discrete sets Q and S are the set of quasi-IDs (QIs) and the set of sensitive attributes (SAs), respectively. In this case, a matrix $T:=(T_{q,s})_{q\in Q,s\in S}$ is defined as a table on Q×S elements of the matrix being non-negative integers.

For convenience of explanation, each of the quasi-ID and the sensitive attribute is explained as an item in the present embodiment. However, the present disclosure is not limited thereto.

Next, the count query that is an analysis performed on the table defined in such a way is defined. The count query is one of primitive operations performed on a table, and is widely used such as cross tabulation of data or association rule extraction.

In general, the count query is explained as the "query for counting the number of individuals who satisfies a given condition in a table." Here, the condition and the way to count are defined in a manner that complies with the definition of the table in the present embodiment.

FIG. 6 is an explanatory diagram showing definition of terms according to an embodiment of the present disclosure. Contents of the table shown in FIG. 6 are the same as the contents of the table shown in FIG. 5.

First, a count query condition set is defined. The count query condition set is defined as a subset C of a direct product Q×S of a set Q of quasi-IDs and a set S of sensitive attributes. As shown in FIG. 6, a set 144 satisfying a condition that "individuals who suffer a cold or a stroke in their 10s to 30s" is one of the count query condition sets.

When the count query condition set C is given, a result of the count query on a table T is represented by $CNT_C(T)$. The $CNT_C(T)$ is a sum of matrix elements $T_{q,s}$ of T indexed by combinations of all quasi-ID values (q) and sensitive attribute values (s) that belong to the count query condition set. Accordingly, a result of the count query performed on the count query condition set 144 in FIG. 6 is 1+2=3.

Mathematical definition of the count query in the present embodiment is as follows.

(Mathematical Definition of Count Query in Present Embodiment)

When the table T on Q×S and the subset C of Q×S are given, the following map is defined as a count query on T based on the condition set C.

$$CNT_C(T) := \sum_{(q,s)\in C} T_{q,s} \quad \text{[Math 1]}$$

Finally, a graph to be used in an algorithm according to the present embodiment is defined.

A set of vertices is V, a set of edges is A, a set of labels is Σ, and a multiplicity is m. In this case, a combination $\langle V, A, \Sigma, m\rangle$ is defined as a labeled multidigraph. Here, Σ is a set of labels associated with the edges, and m is a function that gives the number of edges.

The labeled multidigraph is defined as follows.

(Mathematical Definition of Labeled Multidigraph in Present Embodiment)

In a case where the following are satisfied, $G=\langle V, A, \Sigma, m\rangle$ is a labeled digraph.

1. Each of V and Σ is a finite discrete set. V is referred to as a vertex set, and Σ is referred to as a label set.
2. $A\subseteq V\times V\times\Sigma$ is a finite discrete set and referred to as an edge set. $(v, v', q)\in A$ represents an edge whose starting point is a vertex v, whose end point is a vertex v', and whose label is q.
3. $m: A\rightarrow N_{>0}$ is a map and referred to as a multiplicity: $m: A\rightarrow N_{>0}$ gives the number of edges.

Figure 7:
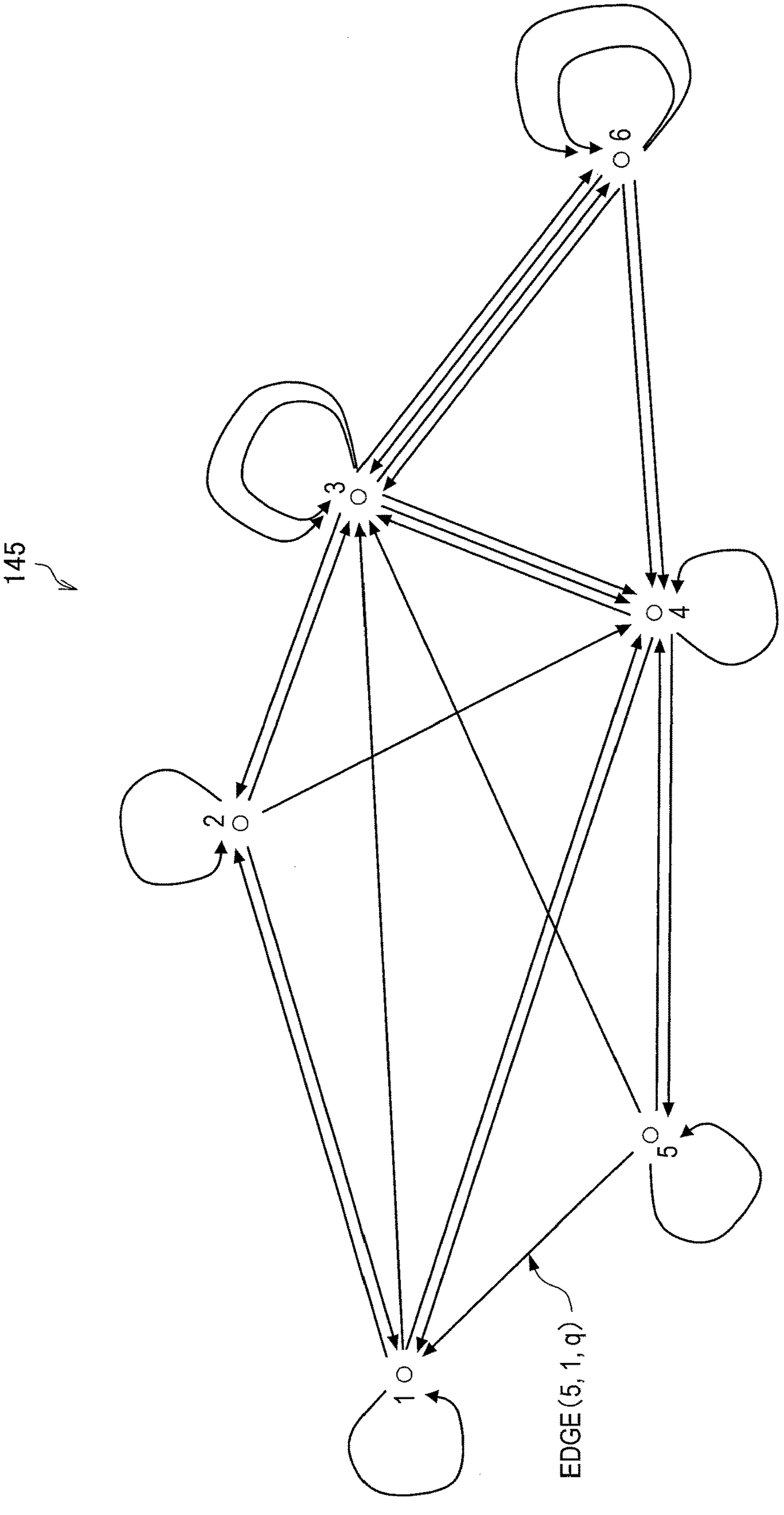
FIG. 7 is an explanatory diagram showing an example of a labeled multidigraph used in an algorithm according to the present embodiment.

FIG. 7 is an explanatory diagram showing an example of a labeled multidigraph used in an algorithm according to the present embodiment. In a labeled multidigraph 145 shown in FIG. 7, numbers 1 to 6 each represents a vertex. In addition, labels are attached to respective edges. The labels are treated as a plurality of the labels. For example, in a labeled multidigraph 145 shown in FIG. 7, a starting point is a vertex 5, an end point is a vertex 1, and a label is q when an edge is (5, 1, q). Note that, in the labeled multidigraph 145 shown in FIG. 7, some label is omitted to avoid complication due to display of signs.

Definition of terms to be used in the explanation of the present embodiment has been shown. Next, definition of privacy to be used in the explanation of the present embodiment is shown.

[Definition of Privacy]

First, a feature of an attacker according to the present embodiment is shown. Accordingly, what kind of premise knowledge the attacker has in the present embodiment is defined. The reason why the attacker is assumed to have the premise knowledge is because it is highly possible for the attacker who tries to violate someone's privacy to research an attack target beforehand and to collect data published by public institutions, normally.

The premise knowledge assumed in the present embodiment is based on "l-diversity: Privacy beyond k-anonymity, ACM Transactions on Knowledge Discovery from Data (TKDD), Vol. 1, Issue 1, Article No. 3, (2007)" that has been written by A. Machanavajjhala et al. and that focus on issues of estimation of sensitive attribute values among privacy issues.

The attacker is assumed to already know the following information.

1. The attacker knows that the attack target belongs to a table. In addition, the attacker knows a value of a quasi-ID of the attack target.

2. The attacker knows information on quasi-IDs in the table. In other words, the attacker knows a value obtained by adding column elements in the table with regard to all sensitive attributes when each quasi-ID value is fixed.

3. The attacker knows information on sensitive attributes in the table. In other words, the attacker knows a value obtained by adding row elements in the table with regard to all quasi-ID values when each sensitive attribute value is fixed.

FIG. 8 is an explanatory diagram showing a feature of an attacker according to the present embodiment. In FIG. 8, reference sign 151 corresponds to the above-described information 1, reference sign 152 corresponds to the above-described information 2, and reference sign 153 corresponds to the above-described information 3. That is, the attacker does not know a value of each element in the table. However, the attacker already knows information shown in FIG. 8.

With regard to the information 1 to the information 3, the assumption 1 is reasonable. This is because the quasi-IDs are customarily attributes such as age, address, and telephone number, and the attacker obtains such attributes by researching the attack target beforehand in many cases. With regard to the assumption 2, such information can be obtained from public information, and attackers having different attack targets may collude and share information. With regard to the assumption 3, such information can be obtained from public information in a similar way.

Note that, it is assumed that the attacker does not know a correspondence relation between quasi-IDs and sensitive attributes. A case where the attacker knows the correspondence relation between quasi-IDs and sensitive attributes means that the attacker knows the table itself. In other words, all privacy is disclosed. That is, in this case, the assumptions mean little.

Mathematical definition of the premise knowledge of the attacker in the present embodiment is as follows.

(Mathematical Definition of Remise Knowledge of Attacker in Present Embodiment)

1. The attacker knows that the target belongs to a table. In addition, the attacker knows a value of a quasi-ID of the target.

2. Quasi-ID information $(d_q: =\Sigma_{s \in S} T_{q,s})_{q \in Q}$ in the table 3. Sensitive attribute information $(e_s: =\Sigma_{q \in Q} T_{q,s})_{s \in S}$ in the table On the basis of the above-described premise knowledge of the attacker, the following privacy violation attack is considered.

On the basis of such premise knowledge of the attacker, the attacker tries to uniquely decide a sensitive attribute value of the attack target by using given values of the result of the count query. As described above, such attack is referred to as the homogeneity attack.

FIG. 9 is an explanatory diagram showing an example of the homogeneity attack. Reference sign 154 represents an example of the value of the result of the count query to be given to the attacker. FIG. 9 shows that the number of elements satisfying the condition that "individuals who suffer a cold or a stroke in their 10s to 30s" is three. In addition, FIG. 9 shows a case where the attacker knows that the value of the quasi-ID of the attack target is 10s.

Mathematical definition of privacy in the present embodiment is as follows.

(Mathematical Definition of Privacy in Present Embodiment)

In a case where the table T: $=(T_{q,s})_{q \in Q,\ s \in S}$ on Q×S and a sequence of subsets $CF=(C_1, C_2, \ldots, C_m)$ of Q×S are given to the attacker, $$((CNT_{C1,C1}, CNT_{C2,C2}), \ldots (CNT_{Cm,Cm})) \tag{1}$$

does not violate 1-Privacy with regard to T if the following are achieved.

First, a set of tables satisfying the following condition is referred to as T'.

1. $\Sigma_{(q,s) \in Ck} T'_{q,s} = c_k$ in a case where any $k \in \{1, 2, \ldots, m\}$
2. $\Sigma_{s \in S} T'_{q,s} = d_q (:= \Sigma_{s \in S} T_{q,s})$ in a case where any $q \in Q$
3. $\Sigma_{q \in Q} T'_{q,s} = e_s (:= \Sigma_{q \in Q} T_{q,s})$ in a case where any $s \in S$ In these cases, with regard to any $q \in Q$ satisfying $d_q \neq 0$, there is at least a way of different $s_1, s_2, \ldots, s_1 \in S$. With regard to each $s_t$, there is a table $T' \in T'$ where $T'_{q,st} \neq 0$.

The expression (1) represents a count query to be checked and a result thereof. Accordingly, leaking of privacy (what is meant by the homogeneity attack) from the expression (1) is an issue.

Three conditions in the mathematical definition of privacy are explained. First, the condition 1 is an equation to be satisfied by the table, the equation having been established by the attacker from the result of the query. Next, the conditions 2 and 3 are premise knowledge of the attacker, and are also equations to be satisfied by the table. In addition, a part "with regard to any $q \in Q$ satisfying $d_q \neq 0$" in the above condition means the rest of premise knowledge of the attacker, or hi other words, means that the quasi-ID of the attack target is already known. Here, the word "any" means that every individual in the table is considered because a data manager does not know who is to be attacked by the attacker.

Meaning of the privacy in the present embodiment is explained. A purpose of the algorithm in the present embodiment is to evaluate a risk of the homogeneity attack. The evaluation corresponds to evaluation of how many possible values of a sensitive attribute of the attack target can be obtained by inference using the provided result of the count query in addition to the premise knowledge that the attacker has in advance. In addition, the evaluation corresponds to search of the number of possible table that is not in conflict with a constraint condition including the provided result of the count query in addition the premise knowledge that the attacker has in advance, and further search of the number of possible sensitive attributes of the attack target in such possible tables.

Figures 12, 13:
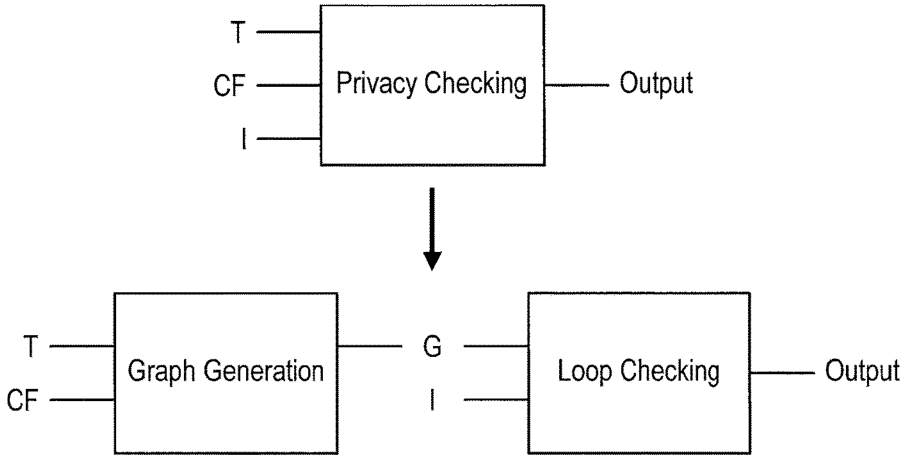
FIG. 12 is an explanatory diagram showing an example of a table.
FIG. 13 is an explanatory diagram showing an overview of an algorithm executed by a data analysis device 100 according to an embodiment of the present disclosure.

For example, with regard to the table shown in FIG. 6, on the basis of only information on the number of "individuals who suffer a cold or a stroke in their 10s to 30s", there are plurality of tables that are not in conflict with such result and premise knowledge of the attacker. FIGS. 10 to 12 are explanatory diagrams each showing an example of a table whose result is not in conflict with the table shown in FIG. 6 on the basis of only the premise knowledge of the attacker and information on the number of "individuals who suffer a cold or a stroke in their 10s to 30s."

There are various tables including three "individuals who suffer a cold or a stroke in their 10s to 30s" and one individual in his/her 10s, such as a table in FIG. 10 including a patient who suffer a cold in his/her 10s, a table in FIG. 11 including a patient who suffer a stroke in his/her 10s, and a table in FIG. 12 including a patient who suffer an infection in his/her 10s. Accordingly, a disease name of a patient in his/her 10s is not uniquely specified on the basis of only information on the number of "individuals who suffer a cold or a stroke in their 10s to 30s." In such a way, the algorithm according to the present embodiment evaluates a risk of leaking privacy on the basis of the number of possible sensitive attributes of each patient.

The definition of privacy according to the present embodiment has been explained. Next, next, an operation of an algorithm executed by the data analysis device 100 according to an embodiment of the present disclosure is explained.

[Operation of Algorithm]

An algorithm executed by the data analysis device 100 according to an embodiment of the present disclosure is an algorithm for evaluating a risk of homogeneity attack when a table T, a group CF of count query condition sets, and a privacy threshold 1 are given. The risk of the homogeneity attack is evaluated by determining whether the number of tables that are not in conflict with the above-described premise knowledge of the attacker is more than or equal to the given threshold 1 ("CF preserves privacy") or is less than the given threshold 1 ("CF violates privacy"). When the number of the tables that are not in conflict with the premise knowledge of the attacker is more than or equal to the given threshold 1, a count query result is in a range of a risk set by the data manager, and the data manager can determine that the count query result can be published.

The algorithm executed by the data analysis device 100 according to an embodiment of the present disclosure can be divided into two algorithms. One is a graph generation algorithm, and the other is a loop check algorithm. FIG. 13 is an explanatory diagram showing an overview of the algorithm executed by the data analysis device 100 according to an embodiment of the present disclosure.

The graph generation algorithm is an algorithm that generates a new group CF' of condition sets from the group CF of count query condition sets and a part of the premise knowledge of the attacker and generates a graph G derived from the new group CF' of condition sets and a table T. The reason why the new group CF' of condition sets is generated is because a problem that checks privacy with regard to any CF in the present embodiment is generally a search problem of nonnegative integer solutions of a system of linear equations with 0/1 coefficients, and is known as a difficult problem. When the above-described mathematical definition of privacy in the present embodiment is formalized, the mathematical definition corresponds to searching for non-negative integer solutions of a system of a linear equation Ax=b. Note that, A is art m×n matrix and $A_{ij}\in\{0,1\}$. In addition, b is an n-dimensional vector, and $b_i$ is a nonnegative integer.

The loop check algorithm is an algorithm that evaluates the number of loops in which respective vertices are set as starting points with respect to the digraph G generated by the graph generation algorithm and performs comparison with the threshold 1. The comparison corresponds to evaluation of a risk of the homogeneity attack.

In the present embodiment, the data analysis unit 110 of the data analysis device 100 executes the graph generation algorithm, and the result determination unit 120 executes the loop check algorithm.

(Graph Generation Algorithm)

First, details of the graph generation algorithm are explained with reference to the appended drawings. FIG. 14 is an explanatory diagram showing an example of the graph generation algorithm executed by the data analysis device 100 according to an embodiment of the present disclosure. FIGS. 15 to 29 are explanatory diagrams illustrating the graph generation algorithm executed by the data analysis device 100 according to an embodiment of the present disclosure.

The graph generation algorithm shown in FIG. 14 is an algorithm that generates a (harder) group DC of count query condition sets from the table T and the group CF of count query condition sets and generates a graph derived from the table T and DC. The graph generation algorithm shown in FIG. 14 is explained using a table shown in FIG. 15 as an example. The whole table shown in FIG. 15 is the table T, and a combination of condition sets $C_1$ and $C_2$ are the condition set CF. The condition set $C_1$ represents "individuals who suffer a cold or a stroke in their 10s to 30s", and the condition set $C_2$ represents "individuals who suffer a stroke or an infection in their 30s to 50s."

Line 1 of the graph generation algorithm shown in FIG. 14 is a process for considering a part (premise knowledge 3) relating to sensitive attributes in the premise knowledge of the attacker. Other premise knowledge is considered at a time of considering how to configure the generated graph and at a time of checking a loop. This process corresponds to rewriting of the premise knowledge relating to sensitive attributes to the count query condition set. A group of such condition sets is set as initial DC.

For example, "Q×{cold}" satisfies a condition of Line 1 of the algorithm shown in FIG. 14. Actually, for example, a patient in his/her "10s" is present with regard to "cold," and a patient "who suffers a cold in his/her 10s" belongs to the table. On the other hand, "Q×{malingering}" does not satisfy the condition of Line 1 of the algorithm. Actually, the table does not include a patient who is "malingering."

Next, the DC specified in Line 1 is sequentially updated by a repeating for loop from Line 2 to Line 13 of the graph generation algorithm shown in FIG. 14. An operation of the algorithm proceeds as follows.

First, one of the count query condition sets C is selected. Next, a set D in DC is selected, and an intersection of the selected D and C is evaluated. At this time, if an entry (q, s) belonging to the table is included in the intersection, the intersection of D and C is temporarily added to DC'. In addition, similar check is performed on a complement of D and C. If the entry (q, s) belonging to the table is included, the complement is added to DC'. Such process can be interpreted as "partition" of D by C.

For example, in a case where DC is "Q×{cold}" and the count query condition set C is $C_1$, as shown in FIG. 17, DC is not included in $C_1$, but includes a common element, with regard to Line 5 of the graph generation algorithm shown in FIG. 14. Accordingly, on the basis of Line 6 of the graph generation algorithm shown in FIG. 14, DC of "Q×{cold}" is partitioned into a part that includes $C_1$ and a part that does not include $C_1$, as shown in FIG. 18.

The graph generation algorithm shown in FIG. 14 performs such partition by the count query condition set C on all sets in DC. Subsequently, as shown in Line 12 of the graph generation algorithm, DC is updated with DC'.

For example, in a case where DC is "Q×{stroke}" and the count query condition set is $C_1$, as shown in FIG. 19, DC is not included in $C_1$, but includes a common element, with regard to Line 5 of the graph generation algorithm shown in FIG. 14. Accordingly, on the basis of Line 6 of the graph generation algorithm shown in FIG. 14, DC of "Q×{stroke}" is partitioned into a part that includes $C_1$ and a part that does not include $C_1$, as shown in FIG. 20. Note that, as shown in FIG. 20, a part that does not include an entry belonging to the table is not considered for subsequent processes.

"Q×{infection}", "Q×{diabetes}", and "Q×{cancer}" each do not include an element common to $C_1$. In accordance with Line 11 of the graph generation algorithm shown in FIG. 14, condition sets shown in FIG. 21 are set as a new group DC of count query condition sets.

Figure 23:
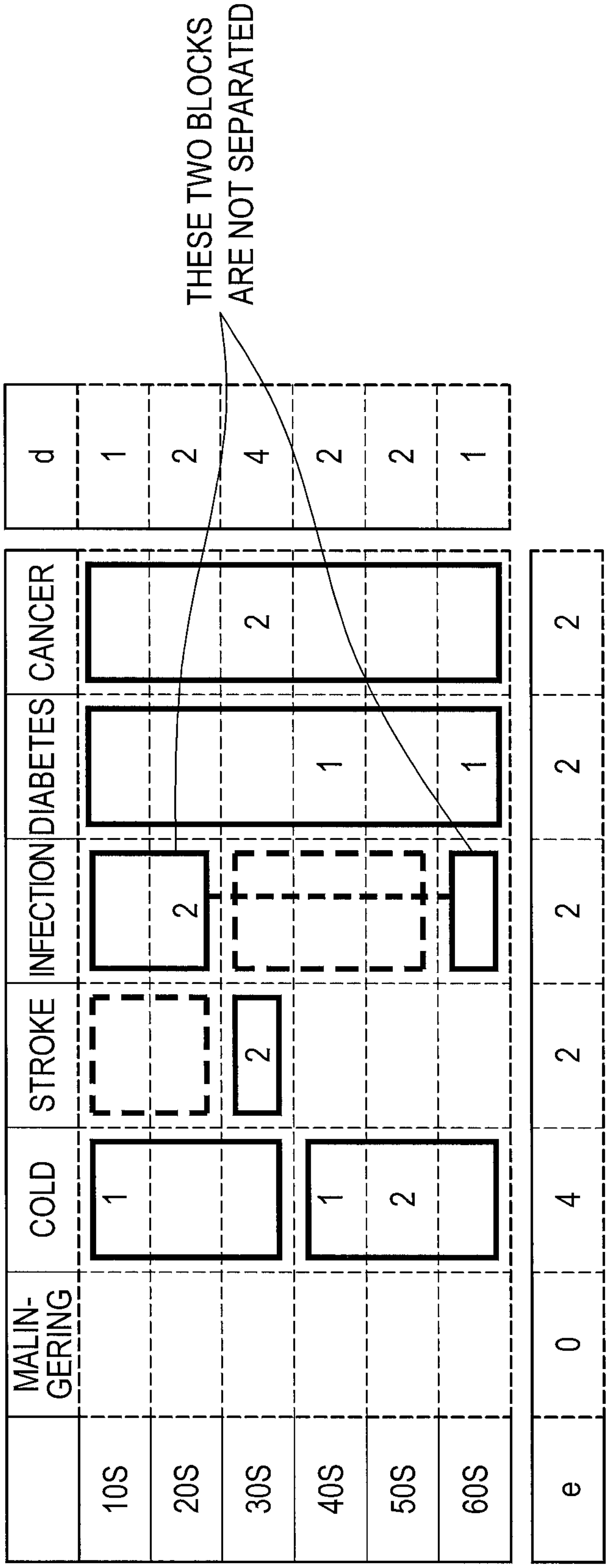
FIG. 23 is an explanatory diagram illustrating a graph generation algorithm executed by a data analysis device 100 according to an embodiment of the present disclosure.

The algorithm performs a similar process on a condition set $C_2$. That is, as shown in FIG. 22, DC of "Q×{stroke}" and "Q×{infection}" is partitioned into a part that includes $C_2$ and a part that does not include $C_2$. Subsequently, as shown in FIG. 23, a new group DC of count query condition sets can be obtained. Note that, in the new group DC of count query condition sets shown in FIG. 23, two blocks in an infection column are not separated. In other words, this part is a condition set of "individuals who suffer an infection in their 10s, 20s or 60s."

Finally, in Line 14 of the graph generation algorithm shown in FIG. 14, a graph derived from the partitioned condition sets and table is generated. In the present embodiment, as the graph derived from the partitioned condition sets and table, a labeled multidigraph given by a definition such as shown in FIG. 24.

Figure 25:
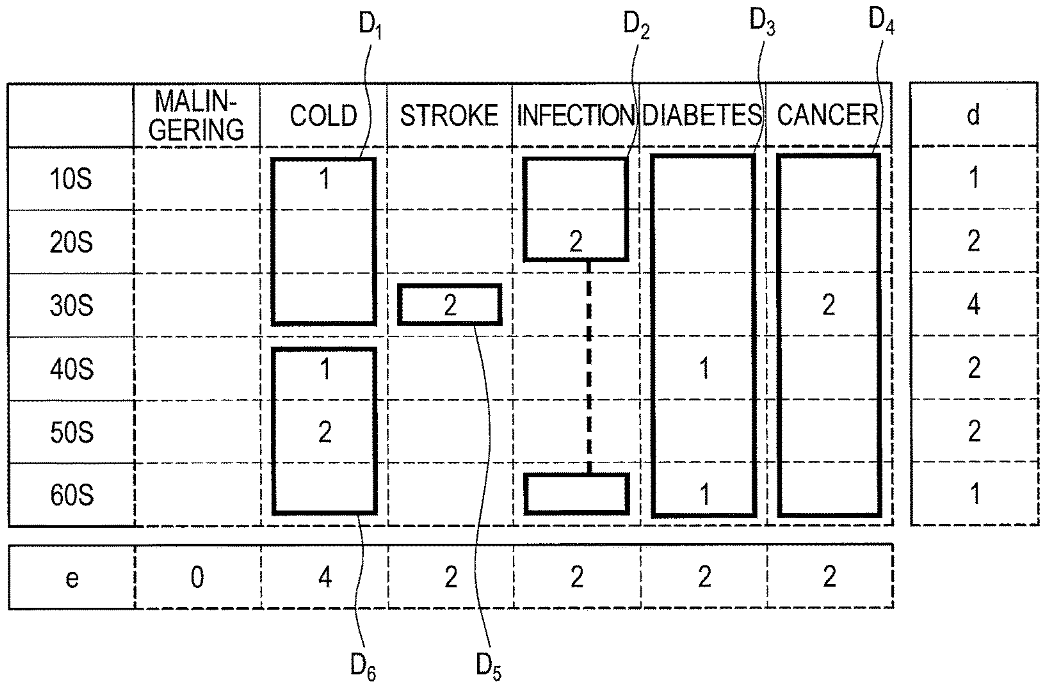
FIG. 25 is an explanatory diagram illustrating a graph generation algorithm executed by a data analysis device 100 according to an embodiment of the present disclosure.
Figure 26:
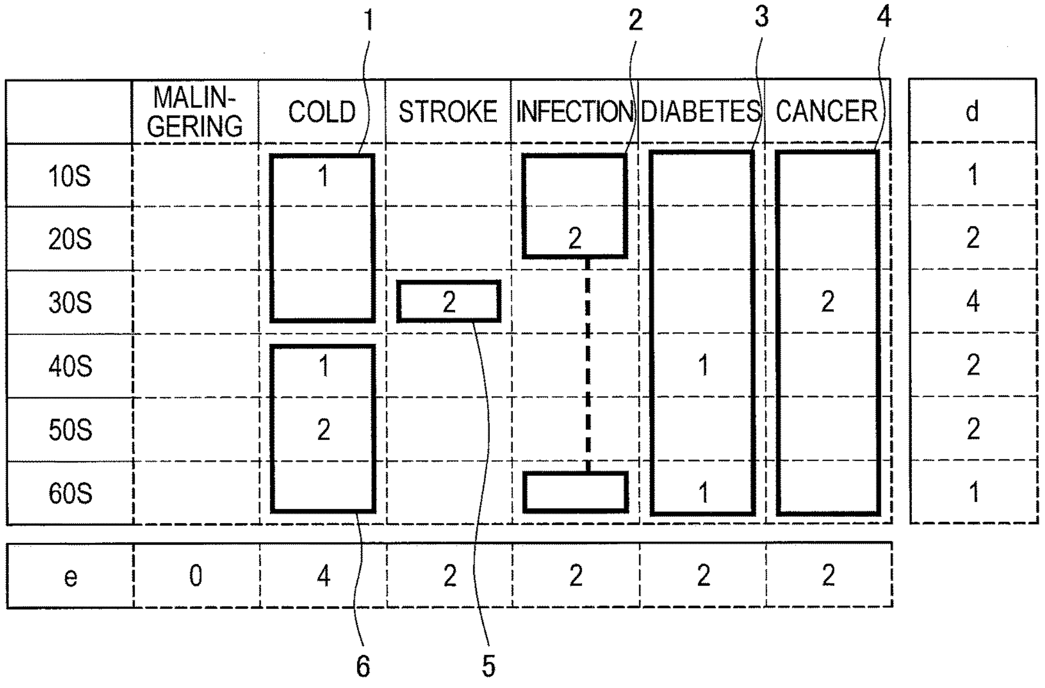
FIG. 26 is an explanatory diagram illustrating a graph generation algorithm executed by a data analysis device 100 according to an embodiment of the present disclosure.

A definition 1 in a graph shown in FIG. 24 means that an index of a set including an entry belonging to a table is treated as a vertex from among sets in DC. According to the definition 1, as shown in FIG. 25, the set D in DC is partitioned by the condition set C, and newly generated sets $D_1$, $D_2$, $D_3$, $D_4$, $D_5$, and $D_6$ are given. Subsequently, as shown in FIG. 26, only indexes of the sets are treated as vertices.

Meaning of the edge in the graph shown in FIG. 24 means that a value of a quasi-ID of an entry belonging to a table and a count query condition set corresponding to the starting point and may also belong to a count query condition set corresponding to the end point. when a value of a sensitive attribute is appropriately rewritten. In the case of this example, 1 is given to each multiplicity.

Figure 27:
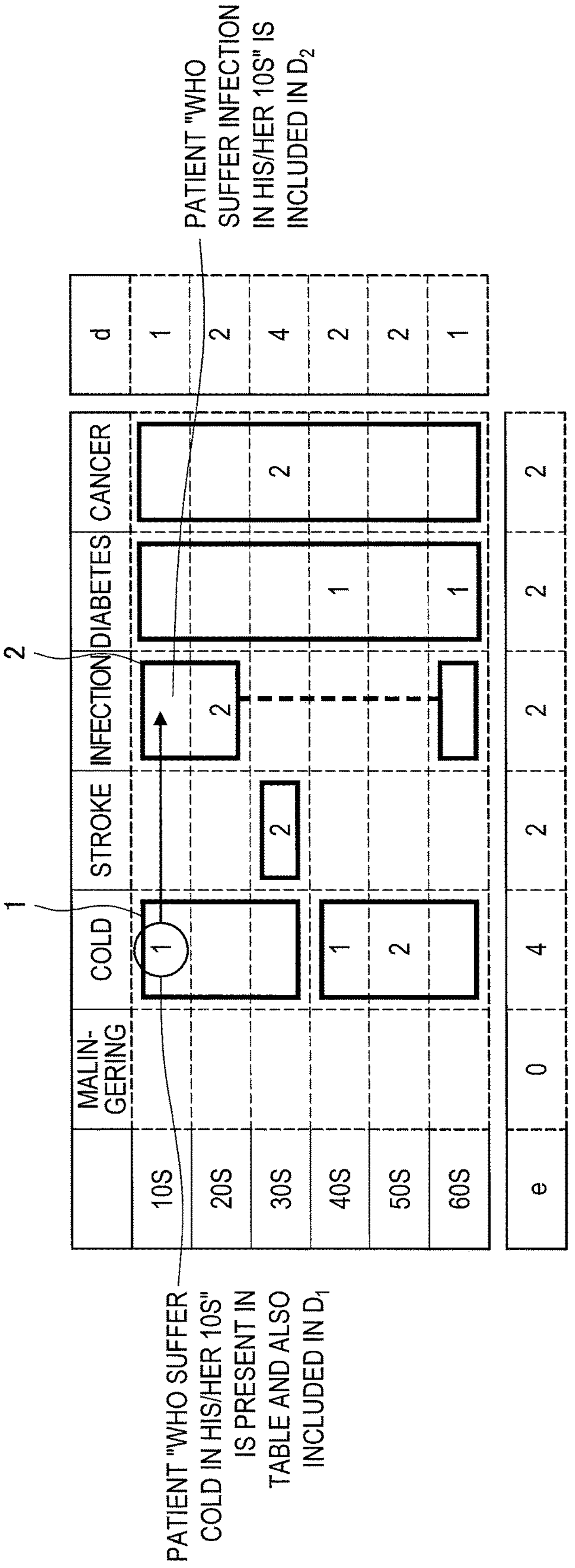
FIG. 27 is an explanatory diagram illustrating a graph generation algorithm executed by a data analysis device 100 according to an embodiment of the present disclosure.
Figure 28:
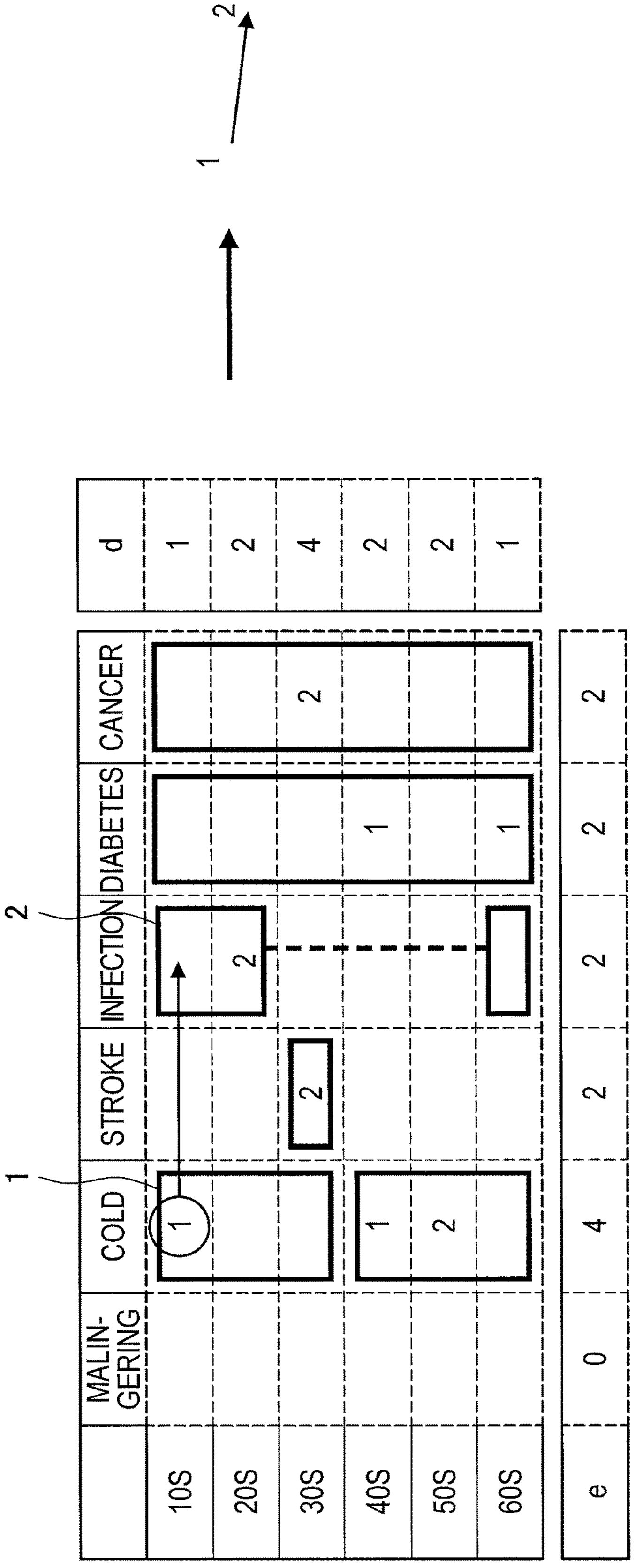
FIG. 28 is an explanatory diagram illustrating a graph generation algorithm executed by a data analysis device 100 according to an embodiment of the present disclosure.

For example, with reference to FIG. 27, a patient "who suffer a cold in his/her 10s" is present in the table and also included in the set $D_1$ corresponding to the vertex 1. In this case, when the patient "who suffer a cold in his/her 10s" is changed to a patient "who suffer an infection in his/her 10s," an edge from the vertex 1 to the vertex 2 is added as shown in FIG. 28.

When explained mathematically, such addition corresponds to addition of an edge from i to j with regard to vertices i and j, when certain $q \in Q$ exists, certain s mad $s' \in S$ exist, and $T_{q,s} \neq 0$, $(q, s) \in D_{q,s}$, and $(q,s) \in D_{q,s'}$ are satisfied.

Figure 29:
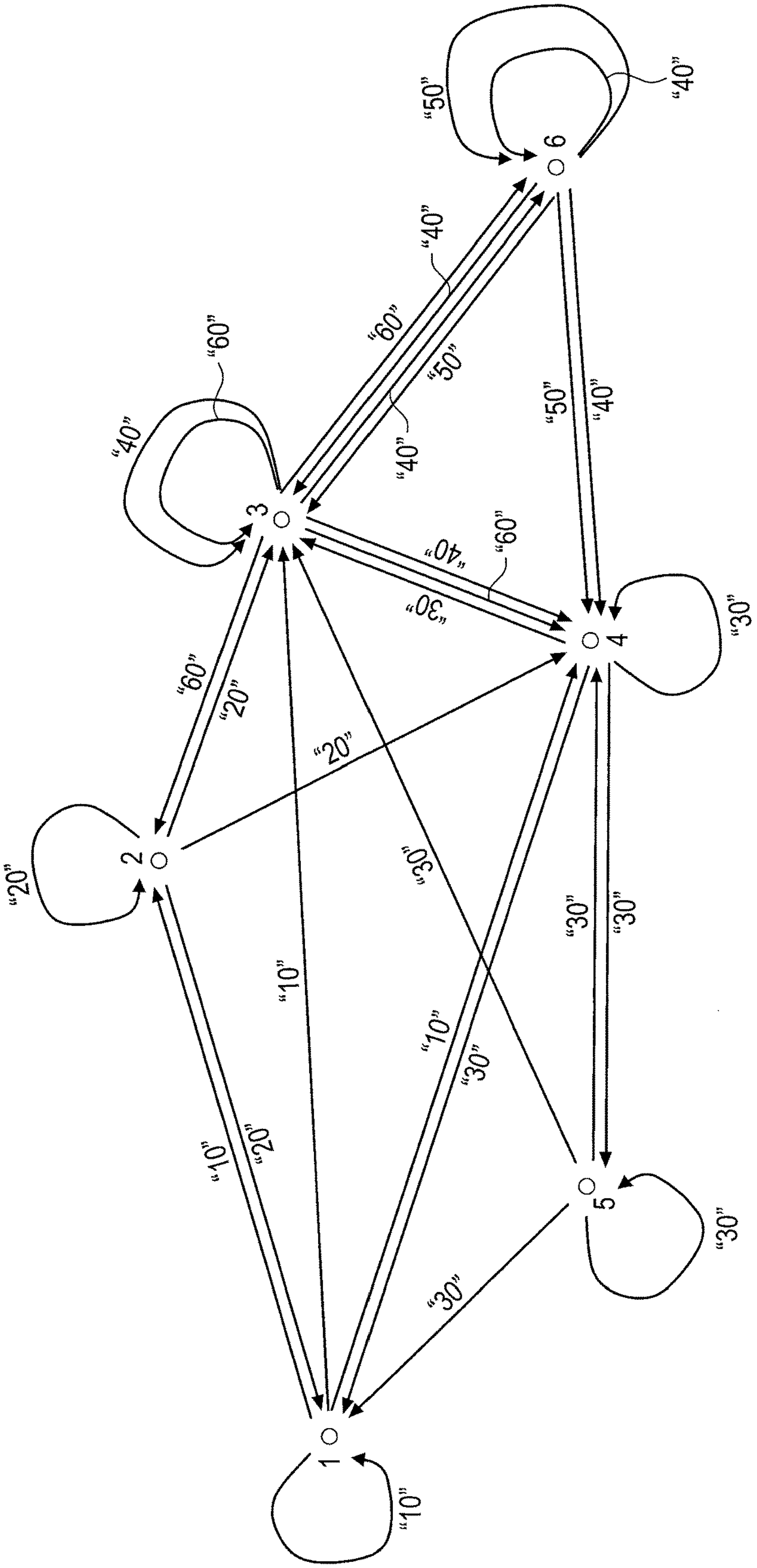
FIG. 29 is an explanatory diagram illustrating a graph generation algorithm executed by a data analysis device 100 according to an embodiment of the present disclosure.

As shown in FIG. 27, in a case where the vertices corresponding to the sets $D_1$, $D_2$, $D_3$, $D_4$, $D_5$, and $D_6$ are given, a graph to be generated is a graph shown in FIG. 29. For example, FIG. 29 shows a single edge (2, 1, "20"). However, on the basis of the definition of multiplicity shown in FIG. 24, there are two edges actually.

(Loop Check Algorithm)

Figure 31:
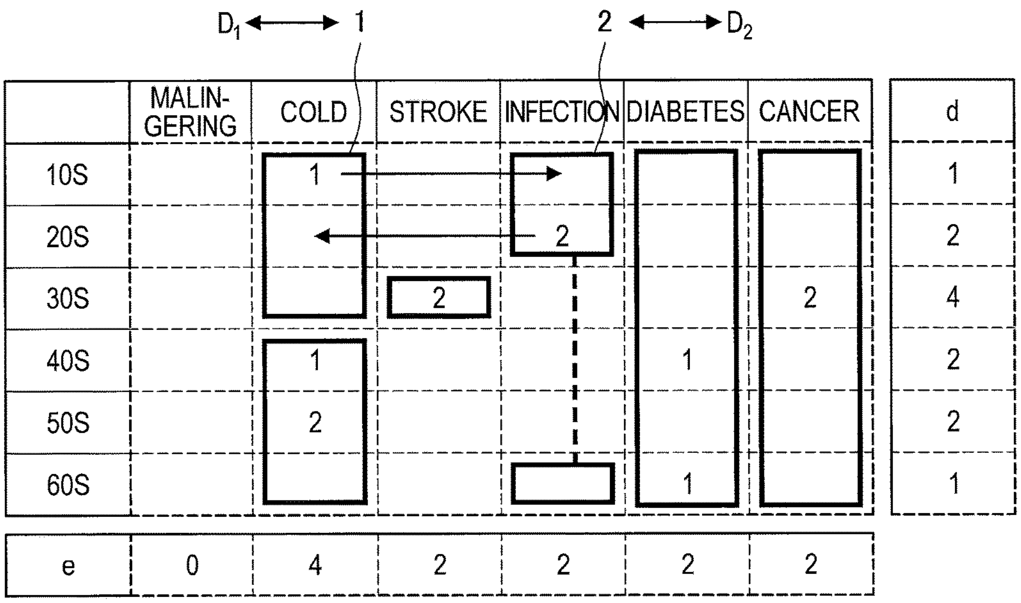
FIG. 31 is an explanatory diagram illustrating a loop check algorithm executed by a data analysis device 100 according to an embodiment of the present disclosure.
Figure 32:
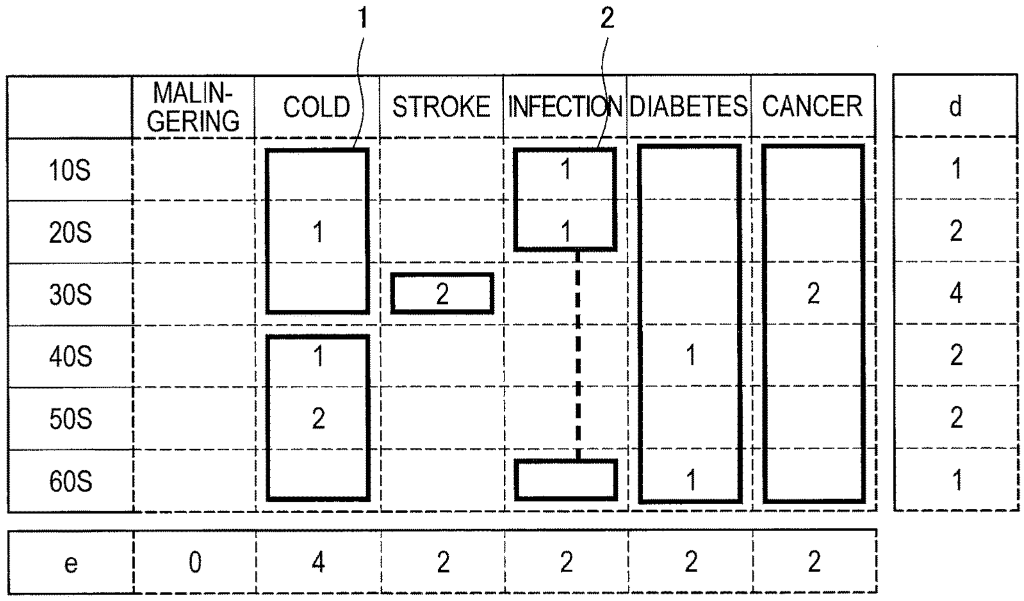
FIG. 32 is an explanatory diagram illustrating a loop check algorithm executed by a data analysis device 100 according to an embodiment of the present disclosure.

A loop check algorithm with regard to a graph generated by graph generation algorithm in such a way is explained. FIG. 30 is an explanatory diagram showing an example of a loop check algorithm executed by the data analysis device 100 according to an embodiment of the present disclosure. In addition, FIGS. 31 and 32 are each an explanatory diagram illustrating a loop check algorithm executed by the data analysis device 100 according to an embodiment of the present disclosure. In addition, the loop check algorithm is explained also with reference to the labeled digraph shown in FIG. 29.

In Lines 1 and 2 of the loop check algorithm shown in FIG. 30, a single quasi-ID and a single vertex are fixed. For example, in the labeled digraph shown in FIG. 29, a quasi-ID "10" and a vertex 1 are selected and fixed. Next, in Lines 3 to 6 of the loop check algorithm, an edge whose starting point is the fixed vertex is selected, and count is performed when there exists a path that returned from an end point to the fixed vertex of the edge.

For example, in the labeled digraph shown in FIG. 29, when the quasi-ID "10" and the vertex 1 are selected and fixed and the vertex 1 is selected as the end point, there exists the path (self loop) that returns from the end point to the starting point. In a similar way, when the quasi-ID "10" and the vertex 1 are selected and fixed and vertices 2, 3, and 4 are selected as end points, there exist paths that return from the end points to starting points. Accordingly, when the quasi-ID "10" and the vertex 1 are selected and fixed, a count value counted in Lines 3 to 6 of the loop check algorithm is four.

Subsequently, if the counted value is less than the given threshold 1, the loop check algorithm determines that the privacy is violated and stops operation. Otherwise, the loop check algorithm selects another vertex and performs count in a similar way. Note that, the loop check algorithm may consider that, when the counted value c becomes the given threshold 1 or more, privacy of an individual corresponding to a quasi-ID at this time is preserved, and may exit from the for loop shown in Lines 4 to 6 of the loop check algorithm in FIG. 30.

With reference to FIGS. 31 and 32, meaning of the loop check algorithm is explained. The selection and fixing of the quasi-ID and the vertex in Lines 1 and 2 of the loop check algorithm are equivalent to selection of a count query condition set corresponding to the vertex and a quasi-ID of an entry belonging to a table. As shown in FIG. 31, the existence of edge is equivalent to an operation of saving the value of the quasi-ID and rewriting of the value of the sensitive attribute.

Accordingly, as shown in FIG. 31, the existence of the loop starting from the starting point means existence of another table in which the value of the sensitive attribute has been changed, the value of the sensitive attribute saving a constraint condition based on the count query condition set.

Accordingly, as shown in FIGS. 31 and 32, it means that there exists a table satisfying the constraint condition that there are one patient in his/her 10s, four patients who suffer a cold, and two patients who suffer an infection if disease of a target patient in his/her 10s is any of a cold and an infection.

In Line 3 of the loop check algorithm, a path from the vertex j to the vertex i has to be found. Such problem is known as a path search problem between two vertices in digraph. It is known that such problem can be effectively solved by using breadth-first search, for example (see Knuth, Donald E. (1997), The Art Of Computer Programming Vol 1. 3rd ed., Boston: Addison-Wesle, for example).

The algorithm executed by the data analysis device 100 according to an embodiment of the present disclosure has been explained. Next, an operation in a whole information processing system according to an embodiment of the present disclosure is explained.

Figure 33:
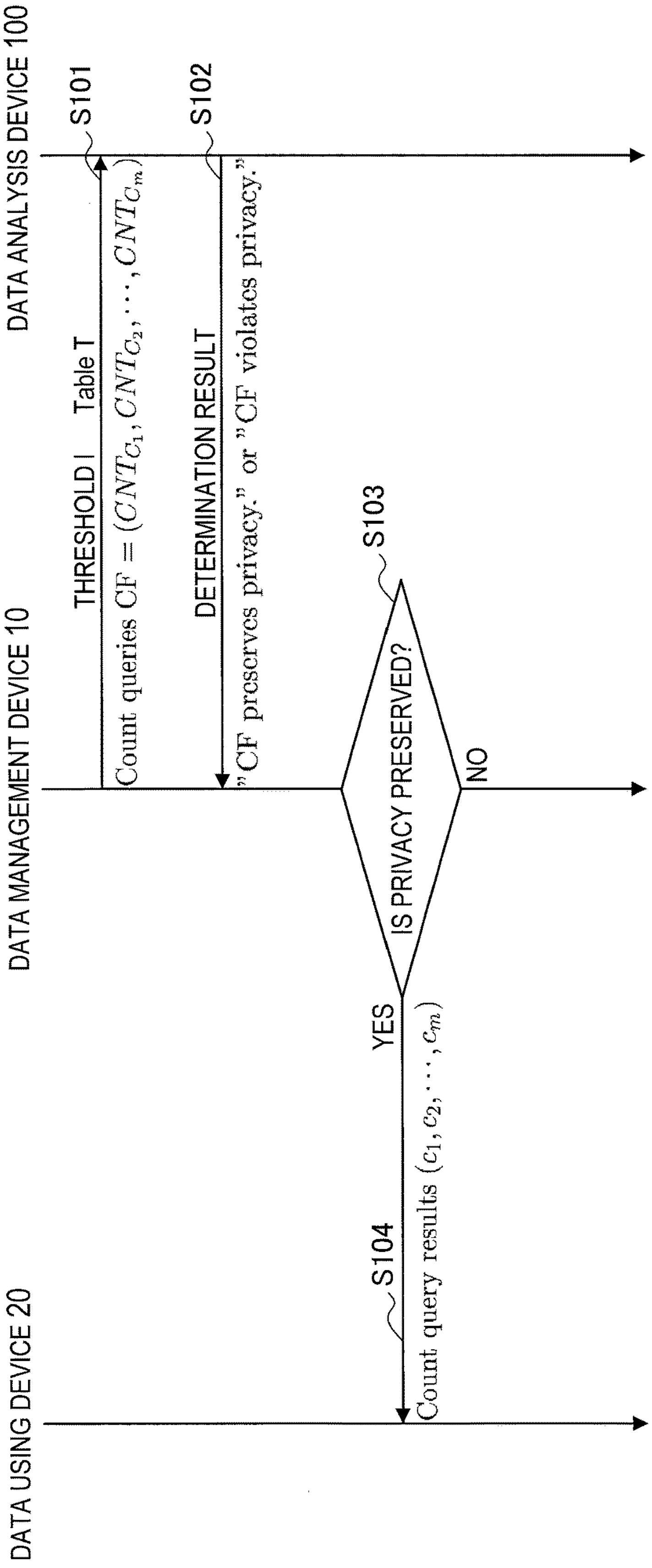
FIG. 33 is a flowchart showing an operation example in a whole information processing system according to an embodiment of the present disclosure.

FIG. 33 is a flowchart showing an operation example in a whole information processing system according to an embodiment of the present disclosure. Hereinafter, with reference to FIG. 33, the operation example in the whole information processing system according to an embodiment of the present disclosure is explained.

The data management device 10 transmits a target table T, a threshold 1, and a group of count query condition sets CF(=$CNT_{C1}$, $CNT_{C2}$, . . . , $CNT_{Cm}$) to the data analysis device 100 so as to confirm whether a result of count query to be provided to the data using device 20 by the data management device 10 violates privacy (Step S101). The provision of the table T, the threshold 1, and the group CF of count query condition sets is executed by the table providing unit 11, for example.

When receiving the table T, the threshold 1, and the group CF of count query condition sets from the data management device 10, the data analysis device 100 executes the above-described algorithms and returns a determination result to the data management device 10 so as to confirm whether the group CF of count query condition sets violates privacy (step S102). The result acquiring unit 12 acquires the determination result sent from the data analysis device 100, for example.

When receiving the determination result from the data analysis device 100, the data management device 10 uses the determination result and determines whether the privacy is preserved by a count query result provided to the data using device 20 by the data management device 10 (Step S103).

In a case where it is determined that the privacy is preserved according to a result of Step S103, the data management device 10 provides the data using device 20 with the count query result ($c_1$, $c_2$, . . . , $c_m$) obtained by the count query analyzed by the data analysis device 100 (Step S104). On the other hand, in a case where it is determined that the privacy is not preserved as a result of Step S103, the data management device 10 does not provide the data using device 20 with the count query result.

Accordingly, by operation of the data management device 10 and the data analysis device 100, the information processing system according to an embodiment of the present disclosure can determine whether privacy is violated by the count query result provided to the data using device 20 by the data management device 10.

According to the above explanation, the data management device 10 transmits all count query condition sets to the data analysis device 100 at a time in a batch matter. However, the present disclosure is not limited to such example. That is, the data management device 10 may transmit each count query to the data analysis device 100 one by one.

Figure 34:
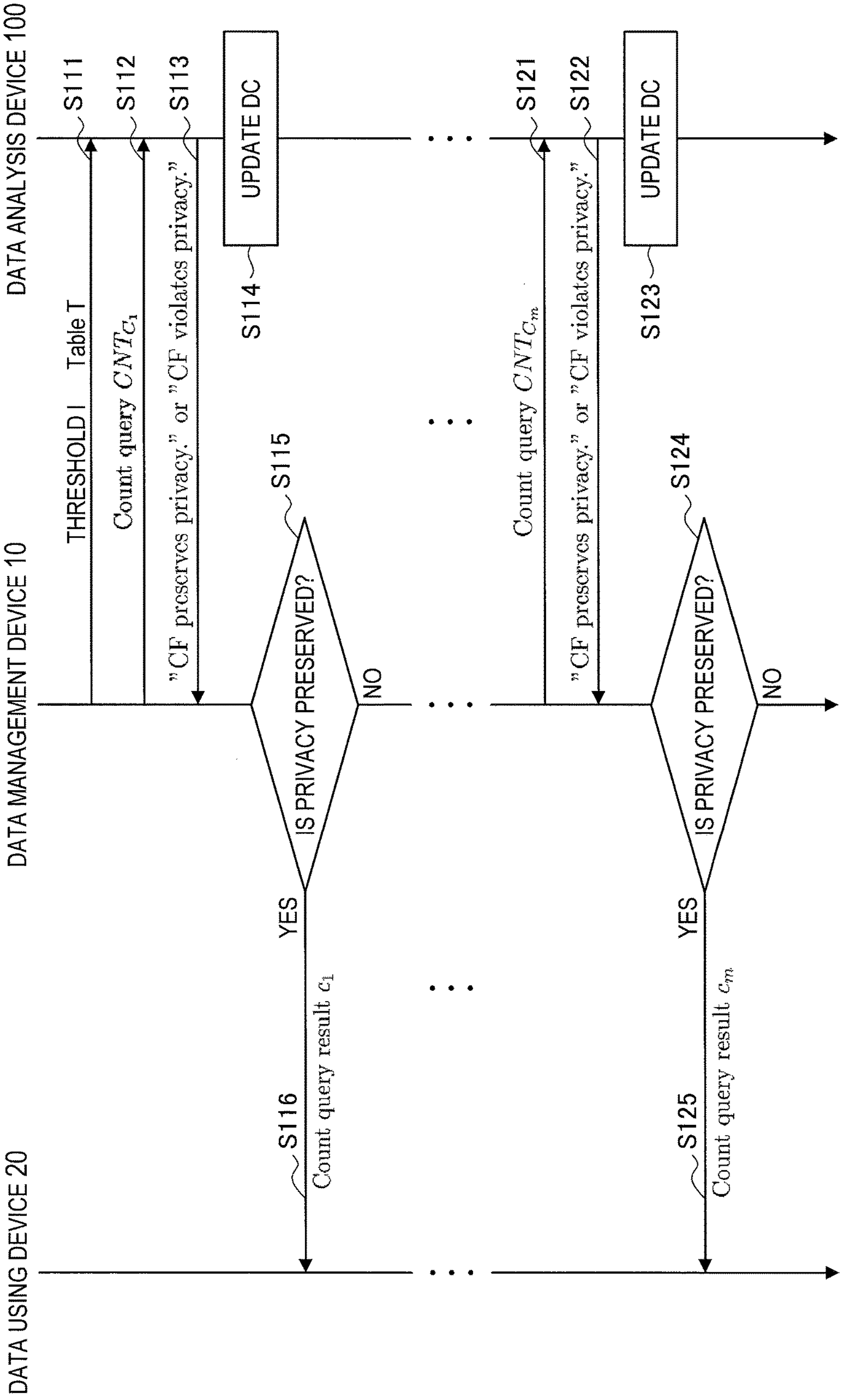
FIG. 34 is a flowchart showing an operation example in a whole information processing system according to an embodiment of the present disclosure.

FIG. 34 is a flowchart showing an operation example in a whole information processing system according to an embodiment of the present disclosure. The data management device 10 transmits a target table T and a threshold 1 to the data analysis device 100 so as to confirm whether a count query result to be provided to the data using device 20 by the data management device 10 violates privacy (Step S111). Subsequently, the data management device 10 transmits, to the data analysis device 100, a count query $CNT_{C1}$ from among the group of count query condition sets CF(=$CNT_{C1}$, $CNT_{C2}$, . . . , $CNT_{Cm}$) (Step S112).

When receiving the table T, the threshold 1, and the count query $CNT_{C1}$ from the data management device 10, the data analysis device 100 executes the above-described algorithms and returns a determination result to the data management device 10 so as to confirm whether the count query $CNT_{C1}$ violates privacy (step S113). Next, the data analysis device 100 updates DC in Line 12 of the graph generation algorithm (Step S114).

When receiving the determination result from the data analysis device 100, the data management device 10 uses the determination result and determines whether the privacy is preserved by a count query result provided to the data using device 20 by the data management device 10 (Step S115).

In a case where it is determined that the privacy is preserved according to a result of Step S115, the data management device 10 provides the data using device 20 with the count query result $c_1$ obtained by the count query $CNT_{C1}$ analyzed by the data analysis device 100 (Step S116). On the other hand, in a case where it is determined that the privacy is not preserved according to a result of Step S115, the data management device 10 does not provide the data using device 20 with the count query result $c_1$ obtained by the count query $CNT_{C1}$.

The analysis performed by the data analysis device 100 and the determination performed by the data management device 10 are performed on all count queries (Steps S121 to S125).

The data analysis device 100 operates the graph generation algorithm and the loop check algorithm while there is one count query. The data analysis device 100 generates DC in Line 1 of the graph generation algorithm only for first count query check. After first count query check, the data analysis device 100 uses the DC generated at latest-performed check in which it has been determined that "CF preserves privacy." By executing the graph generation algorithm in such a way, the data analysis device 100 can consider a previous count query result indicating that the privacy is preserved.

As shown in FIG. 33, in a case where a plurality of count query condition sets are checked at a time, all count query results are checked whether privacy is preserved or violated. On the other hand, as shown in FIG. 34, in a case where the count query condition sets are sequentially checked, each count query result is checked whether privacy is preserved or violated.

Normally, in such sequential check, previous count queries have to be considered when a new count query is sent. On the other hand, as explained above, according to such sequential configuration in the present embodiment, a new generated group DC of count query condition sets are updated, and previous count queries can be handled. In addition, the graph generation algorithm according to the present embodiment performs update by partitioning a set, and a size of DC can be suppressed to be finite size (substantially square of a table size at a maximum), if addition of count query continues.

In the above explanation, the combination of the table, the count query condition set, and the threshold is shown as an input transmitted to the data analysis device 100. However, the present disclosure is not limited to such example. For example, according to the above explanation, the data management device 10 holds a table. However, the data analysis device 100 may hold the table from the beginning. In other words, an algorithm to be executed by the data analysis device 100 may be embedded into a database server. That is, the input to the data analysis device 100 may be the count query condition set and the threshold, and the algorithm may be executed by the table held by the data analysis device 100 in addition to the input. Accordingly, a step of sending the table to the data analysis device 100 can be omitted.

In addition, in the above explanation, the threshold is shown as the input transmitted to the data analysis device 100. However, the present disclosure is not limited to such example. For example, while the threshold is not input to the data analysis device 100, the number of loops that the data analysis device 100 has calculated using the loop check algorithm may be an output of the data analysis device 100 to the data management device 10, as a risk value of each individual corresponding to each quasi-ID.

With reference to the loop check algorithm shown in FIG. 30, an explanation is provided. In the loop check algorithm shown in FIG. 30, the number of loop is calculated (Line 4) with regard to each quasi-ID q (Line 1), comparison with a threshold is performed (Line 7), and presence or absence of privacy violation is determined. Here, a value of the number of loops c is output for each quasi-ID q without performing determination using the threshold in Line 7.

The number of loops c with regard to the quasi-ID q represents the type of a possible sensitive attribute value of an individual corresponding to the quasi-ID q, as explained above. Accordingly, by outputting the number of loops c, the data management device 10 can evaluate a risk of leaking privacy of each individual.

Of course, any combinations are possible with regard to selection of whether a table is input to the data analysis device 100 or the table is held by the data analysis device 100, and with regard to selection of whether a threshold is input to the data analysis device 100 or a risk value of each quasi-ID is output from the data analysis device 100.

3. HARDWARE CONFIGURATION EXAMPLE

Figure 35:
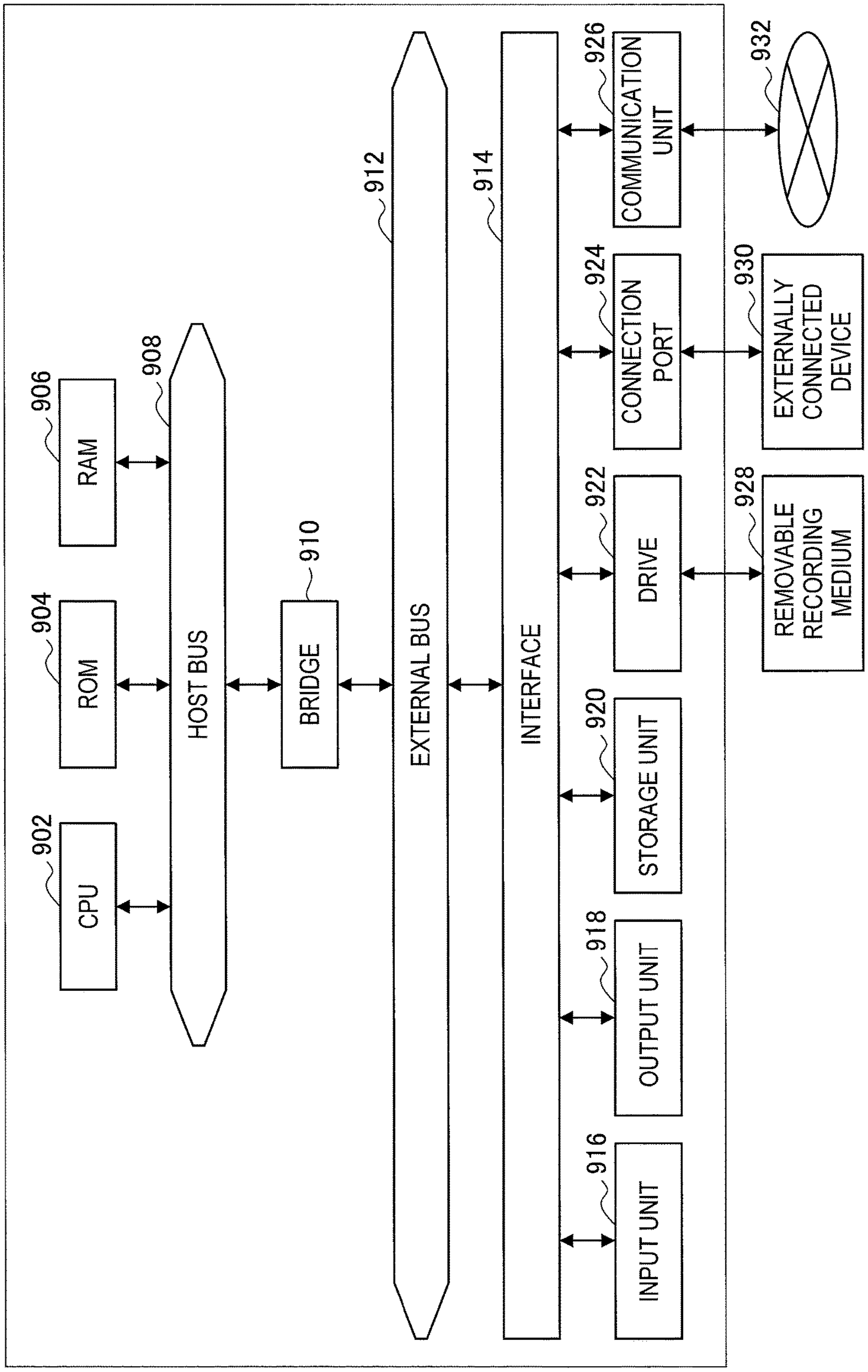
FIG. 35 is an explanatory diagram showing a hardware configuration of an information processing device.

Each algorithm described above can be performed by using, for example, the hardware configuration of the information processing device shown in FIG. 35. That is, a process of each algorithm can be realized by controlling the hardware shown in FIG. 35 using a computer program. Additionally, the mode of this hardware is arbitrary, and may be a personal computer, a mobile information terminal such as a mobile phone, a PHS or a PDA, a game machine, a contact or non-contact IC chip, a contact or non-contact IC card, or various types of information appliances. Moreover, the PHS is an abbreviation for Personal Handy-phone System. Also, the PDA is an abbreviation for Personal Digital Assistant.

As shown in FIG. 35, this hardware mainly includes a CPU 902, ROM 904, RAM 906, a host bus 908, and a bridge 910. Furthermore, this hardware includes an external bus 912, an interface 914, an input unit 916, an output unit 918, a storage unit 920, a drive 922, a connection port 924, and a communication unit 926. Moreover, the CPU is an abbreviation for Central Processing Unit. Also, the ROM is an abbreviation for Read Only Memory. Furthermore, the RAM is an abbreviation for Random Access Memory.

The CPU 902 functions as an arithmetic processing unit or a control unit, for example, and controls entire operation or a part of the operation of each structural element based on various programs recorded on the ROM 904, the RAM 906, the storage unit 920, or a removable recording medium 928. The ROM 904 is means for storing, for example, a program to be loaded on the CPU 902 or data or the like used in an arithmetic operation. The RAM 906 temporarily or perpetually stores, for example, a program to be loaded on the CPU 902 or various parameters or the like arbitrarily changed in execution of the program.

These structural elements are connected to each other by, for example, the host bus 908 capable of performing high-speed data transmission. The host bus 908 is connected through the bridge 910 to the external bus 912 whose data transmission speed is relatively low, for example. Furthermore, the input unit 916 is, for example, a mouse, a keyboard, a touch panel, a button, a switch, or a lever. Also, the input unit 916 may be a remote control that can transmit a control signal by using an infrared ray or other radio waves.

The output unit 918 is, for example, a display device such as a CRT, an LCD, a PDP or an ELD, an audio output device such as a speaker or headphones, a printer, a mobile phone, or a facsimile, that can visually or auditorily notify a user of acquired information. Moreover, the CRT is an abbreviation for Cathode Ray Tube. The LCD is an abbreviation for Liquid Crystal Display. The PDP is an abbreviation for Plasma Display Panel. Also, the ELD is an abbreviation for Electro-Luminescence Display.

The storage unit 920 is a device for storing various data. The storage unit 920 is, for example, a magnetic storage device such as a hard disk drive (HDD), a semiconductor storage device, an optical storage device, or a magneto-optical storage device. The HDD is an abbreviation for Hard Disk Drive.

The drive 922 is a device that reads information recorded on the removable recording medium 928 such as a magnetic disk, an optical disk, a magneto-optical disk, or a semiconductor memory, or writes information in the removable recording medium 928. The removable recording medium 928 is, for example, a DVD medium, a Blu-ray medium, an HD-DVD medium, various types of semiconductor storage media, or the like. Of course, the removable recording medium 928 may be, for example, an electronic device or an IC card on which a non-contact IC chip is mounted. The IC is an abbreviation for Integrated Circuit.

The connection port 924 is a port such as an USB port, an IEEE1394 port, a SCSI, an RS-232C port, or a port for connecting an externally connected device 930 such as an optical audio terminal. The externally connected device 930 is, for example, a printer, a mobile music player, a digital camera, a digital video camera, or an IC recorder. Moreover, the USB is an abbreviation for Universal Serial Bus. Also, the SCSI is an abbreviation for Small Computer System Interface.

The communication unit 926 is a communication device to be connected to a network 932, and is, for example, a communication card for a wired or wireless LAN, Bluetooth (registered trademark), or WUSB, an optical communication router, an ADSL router, or a device for contact or non-contact communication. The network 932 connected to the communication unit 926 is configured from a wire-connected or wirelessly connected network, and is the Internet, a home-use LAN, infrared communication, visible light communication, broadcasting, or satellite communication, for example. Moreover, the LAN is an abbreviation for Local Area Network. Also, the WUSB is an abbreviation for Wireless USB. Furthermore, the ADSL is an abbreviation for Asymmetric Digital Subscriber Line.

4. CONCLUSION

According to an embodiment of the present disclosure as explained above, the data analysis device 100 executes an algorithm including the graph generation algorithm and the loop check algorithm, and it is possible to quantitatively evaluate a risk of leaking privacy relating to a result of a data analysis. By quantitatively evaluating the risk of leaking privacy, it is possible to consider an appropriate trade-off between a risk and a profit that relate to publication of the analysis result.

In addition, the data analysis device 100 can perform the algorithm by using the group CF of count query condition sets as an input. Alternatively, the data analysis device 100 can sequentially perform the algorithm on different count queries. The data analysis device 100 can sequentially perform the algorithm on the different count queries and can check whether privacy is preserved with regard to each count query, while results of previous count queries are considered and a storage region for storing the results of previous count queries is suppressed to be finite size.

The preferred embodiments of the present disclosure have been described above with reference to the accompanying drawings, whilst the present disclosure is not limited to the above examples, of course. A person skilled in the art may find various alterations and modifications within the scope of the appended claims, and it should be understood that they will naturally come under the technical scope of the present disclosure.

Additionally, the present technology may also be configured as below.

(1)

An information processing device including:

a query generation unit configured to generate, on the basis of a table in a database and any query with regard to the table, one or more different queries; and a table search unit configured to search for the number of tables that are different from the table and in which a result of the different query generated by the query generation unit is not in conflict with a result of the any query.

(2)

The information processing device according to (1), wherein the query generation unit generates a graph containing a loop by using the different query generated from the table and the any query.

(3)

The information processing device according to (2), wherein, by calculating the number of loops in the graph generated by the query generation unit, the table search unit searches for the number of tables that are different from the table and in which the result of the different query generated by the query generation unit is not in conflict with the result of the any query.

(4)

The information processing device according to (2) or (3), wherein the graph is a labeled multidigraph.

(5)

The information processing device according to any one of (1) to (4), wherein the table search unit outputs a result of comparison between a predetermined threshold and the number of tables different from the table.

(6)

The information processing device according to (5), wherein the table search unit ends a search with regard to a predetermined condition of the table when the number of tables that are not in conflict with the result of the any query even if a content of the predetermined condition is changed reaches the predetermined threshold or more.

(7)

The information processing device according to any one of (1) to (6), wherein the query generation unit generates the one or more of different queries on the basis of a query with regard to any column in the table.

(8)

The information processing device according to any one of (1) to (7), wherein the query generation unit acquires the table from another device.

(9)

The information processing device according to any one of (1) to (8), further including:

a table holding unit configured to hold the table.

(10)

The information processing device according to any one of (1) to (8), wherein the query generation unit acquires any query with regard to the table from another device.

The information processing device according to any one of (1) to (10), wherein the table search unit presents the number of tables different from the table to another device.

(12)

The information processing device according to any one of (1) to (11), wherein the table search unit executes a search with regard to a combination of the different queries.

(13)

The information processing device according to any one of (1) to (12), wherein the table search unit executes a search with regard to each of the different queries, for each of the different queries.

(14)

An information processing device including:

a table providing unit configured to provide another device with a table in a database and any query with regard to the table; and a result acquisition unit configured to acquire, from the another device, information about whether or not attribute information of an individual is specified from a result of the any query with regard to the table, based on information on the number of tables that are different from the table and in which a result of a different query generated on the basis of the any query is not in conflict with the result of the any query.

(15)

An information processing system including:

a server device; and a terminal device, wherein the terminal device includes a table providing unit configured to provide the server device with any query with regard to a table in a database, and a result acquisition unit configured to acquire, from the server device, information about whether an individual is not specified from a result of the any query with regard to the table after disclosing the result of the any query, based on information on the number of tables that are different from the table and in which a result of a different query generated on the basis of the any query is not in conflict with the result of the any query, and wherein the server device includes a query generation unit configured to generate, on the basis of the table and the any query with regard to the table acquired from the terminal device, one or more different queries, and a table search unit configured to search for the number of tables that are different from the table and in which a result of the different query generated by the query generation unit is not in conflict with the result of the any query, and configured to provide the terminal device with information about whether an individual is not specified from the result of the any query after disclosing the result of the any query, based on the search result.

(16)

An information processing method including:

generating, on the basis of a table in a database and any query with regard to the table, one or more different queries; and searching for the number of tables that are different from the table and in which a result of the generated different query is not in conflict with a result of the any query.

(17)

A computer program for causing a computer to execute:

generating, on the basis of a table in a database and any query with regard to the table, one or more different queries; and searching for the number of tables that are different from the table and in which a result of the generated different query is not in conflict with a result of the any query.

REFERENCE SIGNS LIST

1 information processing system
10 data management device
11 table providing unit
12 result acquiring unit
20 data using device
100 data analysis device
110 data analysis unit
120 result determination unit

The invention claimed is:

1. An information processing device, comprising:

at least one processor configured to:

generate, based on a first table in a database and a first query with regard to the first table, at least one second query different from the first query;

generate a graph based on the at least one second query, wherein the graph comprises a plurality of loops;

determine a count of the plurality of loops in the graph;

search, based on the count of the plurality of loops, for a number of a plurality of second tables in which a result of the at least one second query is not in conflict with a result of the first query, wherein the plurality of second tables are different from the first table;

compare the number of the plurality of second tables with a threshold; and transmit the result of the first query to a first external device based on a result of the comparison that indicates the number of the plurality of second tables is at least equal to the threshold, wherein the first external device determines risk of homogeneity attack information, that corresponds to information about whether attribute information of an individual is specified, based on the result of the first query, and wherein the first external device transmits the result of the first query to a second external device based on the risk of the homogeneity attack information.

2. The information processing device according to claim 1, wherein the graph is a labeled multidigraph.

3. The information processing device according to claim 1, wherein the at least one processor is further configured to end the search, with regard to a specific condition of the first table, based on the determination that the number of the plurality of second tables is more than the threshold, and based on change in content of the specific condition.

4. The information processing device according to claim 1, wherein the at least one processor is further configured to generate the at least one second query based on the first query with regard to a column in the first table.

5. The information processing device according to claim 1, wherein the at least one processor is further configured to acquire the first table from a second external device.

6. The information processing device according to claim 1, further comprising a memory configured to store the first table.

7. The information processing device according to claim 1, wherein the at least one processor is further configured to acquire the first query with regard to the first table from the first external device.

8. The information processing device according to claim 1, wherein the at least one processor is further configured to present the number of the plurality of second tables different from the first table to a second external device.

9. The information processing device according to claim 1, wherein the at least one processor is further configured to execute the search with regard to a combination of different queries.

10. The information processing device according to claim 1, wherein the at least one processor is further configured to execute the search with regard to each of a plurality of different queries.

11. An information processing device, comprising:

at least one processor configured to:

transmit, to a first external device, a first table in a database and a first query with regard to the first table;

acquire, from the first external device, information about whether attribute information of an individual is specified from a result of the first query with regard to the first table, wherein the information is based on a number of a plurality of second tables in which a result of at least one second query is not in conflict with the result of the first query, wherein the first external device determines the number of the plurality of second tables based on a count of a plurality of loops in a graph, and wherein the plurality of second tables are different from the first table;

determine risk of homogeneity attack information, that corresponds to the information about whether the attribute information of the individual is specified, based on the result of the first query; and transmit the result of the first query to a second external device based on the risk of the homogeneity attack information.

12. An information processing system, comprising:

a server device; and a terminal device, wherein the terminal device includes a first processor configured to:

transmit, to the server device, a first query with regard to a first table in a database, and acquire, from the server device, information about whether attribute information of an individual is specified from a result of the first query with regard to the first table after disclosure of the result of the first query, wherein the information is based on a number of a plurality of second tables in which a result of at least one second query generated based on the first query is not in conflict with the result of the first query, and wherein the number of the plurality of second tables are different from the first table, and wherein the server device includes a second processor configured to:

generate, based on the first table and the first query with regard to the first table acquired from the terminal device, the at least one second query, and generate a graph based on the at least one second query, wherein the graph comprises a plurality of loops;

determine a count of the plurality of loops;

search, based on the count of the plurality of loops, for the number of the plurality of second tables in which the result of the at least one second query is not in conflict with the result of the first query;

compare the number of the plurality of second tables with a threshold; and transmit the result of the first query to a first external device based on a result of the comparison that indicates the number of the plurality of second tables is at least equal to the threshold, wherein the first processor is further configured to:

determine risk of homogeneity attack information, that corresponds to the information about whether the attribute information of the individual is specified, based on the result of the first query; and transmit the result of the first query to a second external device based on the risk of the homogeneity attack information.

13. An information processing method, comprising:

generating, based on a first table in a database and a first query with regard to the first table, at least one second query;

generating a graph based on the at least one second query, wherein the graph comprises a plurality of loops;

determine a count of the plurality of loops in the graph;

determining, based on the count of the plurality of loops in the graph, a number of a plurality of second tables in which a result of the generated at least one second query is not in conflict with a result of the first query, wherein the plurality of second tables are different from the first table;

comparing the number of the plurality of second tables with a threshold; and transmitting the result of the first query to an external device based on a result of the comparison that indicates the number of the plurality of second tables are at last equal to the threshold, wherein risk of homogeneity attack information, that corresponds to information about whether attribute information of an individual is specified, is determined based on the result of the first query, and wherein the result of the first query to a second external device is transmitted based on the risk of the homogeneity attack information.

14. A non-transitory computer-readable medium having stored thereon, computer-executable instructions, which when executed by a computer, cause the computer to execute operations, the operations comprising:

generating, based on a first table in a database and a first query with regard to the first table, at least one second query;

generating a graph based on the at least one second query, wherein the graph comprises a plurality of loops;

determine a count of the plurality of loops in the graph;

determining, based on the count of the plurality of loops, a number of a plurality of second tables in which a result of the generated at least one second query is not in conflict with a result of the first query, wherein the plurality of second tables are different from the first table;

comparing the number of the plurality of second tables with a threshold; and transmitting the result of the first query to an external device based on a result of the comparison that indicates the number of the plurality of second tables is at least equal to the threshold, wherein risk of homogeneity attack information, that corresponds to information about whether attribute information of an individual is specified, is determined based on the result of the first query, and wherein the result of the first query to a second external device is transmitted based on the risk of the homogeneity attack information.

* * * * *